(12) United States Patent
Yang et al.

(10) Patent No.: US 7,645,331 B2
(45) Date of Patent: Jan. 12, 2010

(54) HEAT TRANSFER FLUID COMPOSITIONS FOR COOLING SYSTEMS CONTAINING MAGNESIUM OR MAGNESIUM ALLOYS

(75) Inventors: Bo Yang, Ridgefield, CT (US); Filipe J. Marinho, Danbury, CT (US)

(73) Assignee: Honeywell International Inc., Morristown, NJ (US)

( * ) Notice: Subject to any disclaimer, the term of this patent is extended or adjusted under 35 U.S.C. 154(b) by 356 days.

(21) Appl. No.: 11/552,870

(22) Filed: Oct. 25, 2006

(65) Prior Publication Data

US 2007/0120094 A1 May 31, 2007

Related U.S. Application Data (60) Provisional application No. 60/729,889, filed on Oct. 25, 2005.

(51) Int. Cl.
| | | |
|---|---|---|
| *C23F 11/00* | (2006.01) | |
| *C09K 5/00* | (2006.01) | |
| *C09K 5/20* | (2006.01) | |

(52) U.S. Cl. .............. 106/14.41; 106/14.05; 106/14.12; 106/14.42; 106/14.44; 106/104.19; 252/70; 252/71; 252/73; 252/74; 252/75; 252/76; 252/77; 252/78.1; 252/78.5; 252/389.2

(58) Field of Classification Search .............. 106/14.05, 106/14.12, 14.41, 14.42, 14.44; 252/70, 252/71, 73, 74, 75, 76, 77, 78.1, 78.5, 389.2; 165/104.19

See application file for complete search history.

(56) References Cited

U.S. PATENT DOCUMENTS

| | | | |
|---|---|---|---|
| 5,000,866 A | | 3/1991 | Woyciesjes |
| 5,198,143 A | * | 3/1993 | Zuerner et al. ................. 516/67 |
| 6,585,933 B1 | * | 7/2003 | Ehrhardt et al. ............... 422/16 |
| 6,818,147 B2 | * | 11/2004 | Wenderoth et al. ............ 252/73 |
| 6,887,597 B1 | * | 5/2005 | Yang et al. ..................... 429/12 |
| 7,258,814 B2 | * | 8/2007 | Egawa et al. ................... 252/76 |
| 7,442,676 B2 | * | 10/2008 | Yang et al. ................... 510/184 |

FOREIGN PATENT DOCUMENTS

| | | |
|---|---|---|
| DE | 10313280 A1 | 10/2004 |
| EP | 1598407 A2 | 11/2005 |
| EP | 1681332 A1 * | 7/2006 |
| GB | 2049650 A | 12/1980 |
| WO | 9961545 | 12/1999 |
| WO | WO2005/037950 A1 * | 4/2005 |

OTHER PUBLICATIONS

International Search Report dated Apr. 11, 2007 for International Application No. PCT/US2006/041400, International Filing Date Oct. 25, 2006.

Written Opinion of the International Searching Authority dated Apr. 11, 2007, for International Application No. PCT/US2006/041400, International Filing Date Oct. 25, 2006.

* cited by examiner

*Primary Examiner*—Anthony J Green
(74) *Attorney, Agent, or Firm*—Cantor Colburn LLP (57) ABSTRACT

In one embodiment, a corrosion inhibiting composition is formed by combining: (a) an inorganic phosphate; (b) a water soluble polyelectrolyte polymer dispersant; (c) a tri or tetra-carboxylic acid; and (d) at least one additional component comprising at least one of a $C_4$-$C_{22}$ aliphatic or aromatic mono- or dicarboxylic acid, a silicate and at least one of a silicone or a silicate stabilizing siloxane compound, and mixtures thereof. Also disclosed are heat transfer fluids that include about 5% to about 99% by weight of freezing point-depressing agent; about 1% to about 95% by weight of water; and the disclosed corrosion inhibitor composition. A method of reducing corrosion in a heat transfer system containing one or more components that contain magnesium or a magnesium alloy requires that the system and the magnesium containing components be in contact with the disclosed heat transfer fluid.

15 Claims, 1 Drawing Sheet

Figure 1. Schematic diagram of an illustrated example of a hybrid vehicle cooling system

HEAT TRANSFER FLUID COMPOSITIONS FOR COOLING SYSTEMS CONTAINING MAGNESIUM OR MAGNESIUM ALLOYS

This application claims the benefit of U.S. Provisional application, Ser. No. 60/729,889, filed Oct. 25, 2005, the contents of which are incorporated herein by reference thereto. Reference is also made to the following U.S. patent applications Ser. No. 11/221,595, filed on Sep. 8, 2005; Ser. No. 11/221,593, filed on Sep. 8, 2005; Ser. No. 11/222,506, filed on Sep. 8, 2005; Ser. No. 11/222,024, filed on Sep. 8, 2005, Ser. No. 10/838,046 filed on May 3, 2004 and Ser. No. 10/370,170 filed on Feb. 19, 2003, the contents each of which are incorporated herein by reference thereto.

BACKGROUND

Among the available common engineering alloys, magnesium alloys have the highest strength-to-weight ratio. Use of magnesium alloys in automobiles has been increasing due to the need of increasing fuel economy, reducing pollution and lessening our dependence on petroleum. Recently, several new applications in various parts of vehicles have been developed, including oil pans, gearbox housings, and radiator support assemblies.

However, use of magnesium alloys for vehicle powertrain systems, such as engine blocks, has been quite limited to date. One limitation on the use of magnesium alloys in powertrain systems is their poor corrosion resistance, especially when they are in contact with the water/glycol based heat transfer fluids (coolants) commonly used in vehicle cooling systems.

The corrosion inhibitors currently used in water/glycol based heat transfer fluids are formulated with specific blends of silicates, nitrites, mono- or di-carboxylic acids or their salts (such as $C_4$-$C_{18}$ mono- or di-carboxylic acids, and benzoates), molybdates, nitrates, phosphates, phosphonates, and/or borates to provide corrosion protections for various metals in the cooling systems. Although many of these inhibitors can provide satisfactory corrosion protection for various metallic components used in vehicle cooling systems (including aluminum, cast iron, steel, copper, brass, and solder), corrosion protection for magnesium alloys is poor. Corrosion rates of the magnesium alloys are especially high when the alloys are in galvanic contact with other metals and/or at high operating temperature (e.g., >90° C.), and in contact with heat transfer fluids not designed for use with magnesium alloys.

Thus, there is a need for new and more effective corrosion inhibitor compositions and corrosion inhibiting heat transfer fluids for use in vehicle cooling systems containing magnesium or magnesium alloys.

SUMMARY

Disclosed are corrosion inhibiting compositions as well as heat transfer fluids and heat transfer systems employing the same. Also disclosed are methods or reducing corrosion in heat transfer systems having magnesium containing components.

In one embodiment, a corrosion inhibiting composition is formed by combining the following components: (a) an inorganic phosphate; (b) a water soluble polyelectrolyte polymer dispersant; (c) a tri or tetracarboxylic acid; and (d) at least one additional component comprising at least one of a $C_4$-$C_{22}$ aliphatic or aromatic mono- or dicarboxylic acid; a silicate and at least one of a silicone or a silicate stabilizing siloxane compound; and mixtures thereof. In another embodiment, component (d) may further include one or more members selected from the group consisting of a $C_4$-$C_{22}$ aliphatic or aromatic mono- or dicarboxylic acid, a fluoride, spiculisporic acid, a molybdate, an azole compound, a phosphonate, a phosphinate, an amine salt, a borate or mixtures thereof.

Also disclosed are heat transfer fluids that include about 5% to about 99% by weight of freezing point-depressing agent; about 1% to about 95% by weight of water; and the disclosed corrosion inhibitor composition.

A method of reducing corrosion in a heat transfer system containing one or more components that contain magnesium or a magnesium alloy is also disclosed. The method requires that the system and the magnesium containing components be placed in contact with the disclosed heat transfer fluid, i.e., that the disclosed heat transfer fluids be employed within the heat transfer system.

In another embodiment, a heat transfer fluid is disclosed that includes about 5% to about 99% by weight of freezing point-depressing agent; about 1% to about 95% by weight of water; and a corrosion inhibiting composition formed by combining components that include at least (a) an inorganic phosphate; (b) a water soluble polyelectrolyte polymer dispersant; and (d) at least one additional component comprising at least one of a $C_4$-$C_{22}$ aliphatic or aromatic mono- or dicarboxylic acid; a silicate and at least one of a silicone or a silicate stabilizing siloxane compound; and mixtures thereof. In another embodiment, this particular embodiment of the disclosed heat transfer fluid will further comprise a tri or tetracarboxylic acid (c).

Finally, a method of reducing corrosion in a heat transfer system comprising at least one component comprising magnesium or a magnesium alloy is provided. In one embodiment, this disclosed method includes contacting the at least one component with a heat transfer fluid comprising about 5% to about 99% by weight of freezing point-depressing agent; about 1% to about 95% by weight of water; and a corrosion inhibiting composition formed by combining components comprising: (a) an inorganic phosphate; (b) a water soluble polyelectrolyte polymer dispersant; and (d) at least one additional component comprising at least one of a $C_4$-$C_{22}$ aliphatic or aromatic mono- or dicarboxylic acid, a silicate and a silicate stabilizing silicone, and mixtures thereof.

DETAILED DESCRIPTION OF EXEMPLARY EMBODIMENTS

The corrosion inhibiting compositions and heat transfer fluids described herein are derived from a combination of components that provide corrosion inhibition for magnesium and magnesium-containing alloys, while simultaneously providing corrosion protection for other metals or alloys that are commonly used in heat transfer systems. Those of skill in the art will appreciate that 'corrosion inhibition' and 'corrosion protection' are used interchangeably herein. The disclosed corrosion inhibiting compositions and heat transfer fluids employing the same are accordingly suitable for use in vehicle powertrain systems and other systems having components containing magnesium and/or magnesium alloys that must be in contact with a heat transfer fluid or coolant.

In one embodiment, the disclosed heat transfer fluids are formed from a composition containing about 5% to 99% by weight of freezing point-depressing agent; about 1% to 95% by weight of water, preferably de-ionized water; and a corrosion inhibitor composition as disclosed herein.

Freezing point depressants suitable for use herein are alcohols, including monohydric alcohols, polyhydric alcohols, and mixtures thereof. Illustrative examples of suitable alcohols include methanol, ethanol, propanol, butanol, furfurol, furfuryl alcohol, tetrahydrofurfuryl alcohol, ethoxylated furfuryl alcohol, ethylene glycol, diethylene glycol, triethylene glycol, 1,2-propylene glycol, 1,3-propylene glycol, dipropylene glycol, butylene glycol, glycerol, glycerol-1,2-dimethyl ether, glycerol-1,3-dimethyl ether, the monoethylether of glycerol, sorbitol, 1,2,6-hexanetriol, trimethylolpropane, alkoxy alkanols such as methoxyethanol, and mixtures thereof.

In one embodiment the alcohol is present in the composition in an amount of about 10% to about 99.9% by weight, preferably about 30% to 99.5% by weight, more preferably about 40% to about 97% by weight, based on the total weight of the composition.

Water suitable for use in the disclosed compositions includes deionized water or de-mineralized water, and softened water (i.e., water with no hardness ions). In one embodiment the water is present in the composition in an amount of about 0.1% to about 90% by weight, and preferably about 0.5% to 70%, by weight, more preferably 1% to about 60% by weight, based on the total weight of the composition.

In addition to the disclosed inhibitor compositions, the heat transfer fluids may further comprise those additives as are known to those of skill in the art. For example, one or more additives such as antifoaming agents, defoamers, dispersants, scale inhibitors, surfactants, colorants, and the like, as well as mixtures thereof may be added to the disclosed heat transfer fluids.

The disclosed heat transfer fluids will further comprise a corrosion inhibitor composition as is described herein. Such corrosion inhibitor compositions are believed to provide improvements with regard to corrosion protection, especially as regards the inhibition of undesirable corrosion of magnesium or magnesium alloy containing components in heat transfer systems. Accordingly, the corrosion inhibitor or inhibiting compositions disclosed heren may also be referred to as magnesium corrosion inhibiting compositions. It will be appreciated however, that such compositions also provide corrosion protection for other metals in addition to magnesium.

In one embodiment, a corrosion inhibiting composition is formed by combining components comprising: (a) an inorganic phosphate; (b) a water soluble polyelectrolyte polymer dispersant; and (d) at least one additional component comprising at least one of a $C_4$-$C_{22}$ aliphatic or aromatic mono- or dicarboxylic acid; a silicate and at least one of a silicone or a silicate stabilizing siloxane compound; and mixtures thereof.

In one exemplary embodiment, a corrosion inhibiting composition is formed by combining components comprising: (a) an inorganic phosphate; (b) a water soluble polyelectrolyte polymer dispersant; (c) a tri or tetracarboxylic acid; and (d) at least one additional component comprising at least one of a $C_4$-$C_{22}$ aliphatic or aromatic mono- or dicarboxylic acid; a silicate and at least one of a silicone or a silicate stabilizing siloxane compound; and mixtures thereof.

In yet another embodiment, component (d) of the disclosed corrosion inhibiting compositions may further include one or more members selected from the group consisting of a $C_4$-$C_{22}$ aliphatic or aromatic mono- or dicarboxylic acid, a fluoride, spiculisporic acid, a molybdate, an azole compound, a phosphonate, a phosphinate, an amine salt, a borate or mixtures thereof.

As discussed above, one or more inorganic phosphates (a) are employed in the disclosed corrosion inhibiting compositions.

Illustrative examples of suitable inorganic phosphates (a) include orthophosphates (e.g., phosphoric acid, water soluble orthophosphate salts, such as alkali metal phosphates or ammonium phosphate and the like), pyrophosphates (e.g., tetra-potassium pyrophosphate, other alkali metal pyrophosphates, and the like), hexametaphosphates (e.g., alkali metal hexametaphosphates), and other polyphosphates (e.g., alkali metal polyphosphates) as well as combinations of such suitable inorganic phosphates.

In general, inorganic phosphates (a) suitable for use in the disclosed corrosion inhibiting compositions are in either the acid form of the inorganic phosphate or are present as any of the corresponding metal, ammonium or amine salts. In one embodiment, the inorganic phosphate (a) will be phosphoric acid.

In one embodiment, the inorganic phosphate (a) may be present in the disclosed magnesium corrosion inhibiting compositions in an amount of from 0.001 to 25.0 weight %, based on the weight of the magnesium corrosion inhibiting composition.

In one embodiment, the inorganic phosphate (a) concentration in a heat transfer fluid employing the disclosed corrosion inhibiting composition is about 0.002% to 5% by weight, preferably in the range of 0.01% to 1% by weight, based on the total weight of the heat transfer fluid.

The disclosed magnesium corrosion inhibiting compositions will further comprise a water soluble polyelectrolyte polymer dispersant (b).

Illustrative examples of the polymer dispersant (b) include water soluble polymers such as polyelectrolyte dispersants derived from a polymerizable monomer containing at least one group selected from unsaturated carboxylic acids or salts, unsaturated amides, unsaturated acid anhydrides, unsaturated nitriles, unsaturated carbonyl halides, unsaturated carboxylate esters, unsaturated ethers, unsaturated alcohols, unsaturated sulfonic acids or salts, unsaturated phosphonic acids or salts, unsaturated phosphinic acids or salts, or combinations thereof.

In general, water soluble polymers suitable for use as water soluble polyelectrolyte polymer dispersant (b) include homopolymers, copolymers, terpolymers and inter-polymers having (1) at least one monomeric unit containing a $C_3$ to $C_{16}$ monoethylenically unsaturated mono- or dicarboxylic acid or their alkali metal or ammonium salts; or (2) at least one monomeric unit containing a $C_3$ to $C_{16}$ monoethylenically unsaturated mono- or dicarboxylic acid derivative such as an amide, nitrile, carboxylate ester, acid halide (e.g., chloride), acid anhydride, or combination thereof. In one embodiment, the water soluble polymer suitable for use herein as component (b) may comprise at least 5% (preferably at least 10%) mer units of (1) or (2).

Examples of suitable monocarboxylic acids for making the water soluble polymers (b) include acrylic acid, methacrylic acid, ethyl acrylic acid, vinylacetic acid, allylacetic acid, and crotonic acid.

Examples of monocarboxylic acid esters suitable for making the water soluble polymers (b) include butyl acrylate, n-hexyl acrylate, t-butylaminoethyl methacrylate, diethylaminoethyl acrylate, hydroxyethyl methacrylate, hydroxyethyl acrylate, hydroxypropyl acrylate, hydroxypropyl methacrylate, diethylaminoethyl methacrylate, dimethylaminoethyl methacrylate, dimethylaminoethyl acrylate, methyl acrylate, methyl methacrylate, tertiary butylacrylate, and vinyl acetate.

Examples of dicarboxylic acids suitable for making the water soluble polymers (b) include maleic acid, itaconic acid, fumaric acid, citaconic acid, mesaconic acid, and methylenemalonic acid.

Examples of amides suitable for making the water soluble polymers (b) include acrylamide (or 2-propenamide), methacrylamide, ethyl acrylamide, propyl acrylamide, N-t-butylacrylamide, tertiary butyl methacrylamide, tertiary octyl acrylamide, N,N-dimethylacrylamide (or N,N-dimethyl-2-propenamide), dimethylaminopropyl methacrylamide, cyclohexyl acrylamide, benzyl methacrylamide, vinyl acetamide, sulfomethylacrylamide, sulfoethylacrylamide, 2-hydroxy-3-sulfopropyl acrylamide, sulfophenylacrylamide, N-vinyl formamide, N-vinyl acetamide, 2-hydroxy-3-sulfopropyl acrylamide, N-vinyl pyrrolidone (a cyclic amide), 2-vinylpyridene, 4-vinylpyridenem and carboxymethylacrylamide.

Examples of anhydrides suitable for making the water soluble polymers (b) include maleic anhydride (or 2,5-furandione) and succinic anhydride.

Examples of nitriles suitable for making the water soluble polymers (b) include acrylonitrile and methacrylonitrile.

Examples of acid halides suitable for making the water soluble polymers (b) include acrylamidopropyltrimethylammonium chloride, diallyldimethylammonium chloride, and methacrylamidopropyltrimethylammonium chloride.

In addition, the water soluble polymers (b) containing at least one monomeric unit of the following monomers may also be used: allylhydroxypropylsulfonate, AMPS or 2-acrylamido-2-methylpropane sulfonic acid, polyethyleneglycol monomethacrylate, vinyl sulfonic acid, styrene sulfonic acid, acrylamidomethyl propane sulfonic acid, methallyl sulfonic acid, allyloxybenzenesulfonic acid, 1,2-dihydroxy-3-butene, allyl alcohol, allyl phosphonic acid, ethylene glycoldiacrylate, aspartic acid, hydroxamic acid, 2-ethyl-oxazoline, adipic acid, diethylenetriamine, ethylene oxide, propylene oxide, ammonia, ethylene diamine, dimethylamine, diallyl phthalate, 3-allyloxy-2-hydroxy propane sulfonic acid, polyethylene glycol monomethacrylate, sodium styrene sulfonate, and an alkoxylated allyl alcohol sulfonate, and combinations containing at least one of the foregoing.

In one exemplary embodiment, the water soluble polyelectrolyte polymer dispersant (b) will comprise at least 5 mole % of mer units (i.e., as polymerized units) resulting from the polymerization of one or more monomers selected from the group consisting of acrylic acid, methacrylic acid, crotonic acid, vinyl acetic acid, 4-methyl-4 penenoic acid, maleic acid, maleic anhydride, 1,2,3,6-tetrahydrophthalic anhydride, 3,6-epoxy-1,2,3,6-tetrahydrophthalic anhydride, 5-norbornene-2,3-dicarboxylic anhydride, bicycle[2,2,2]-5-octene-2,3-dicarboxylic anhydride, 3-methyl-1,2,6-tetrahydrophthalic anhydride, 2-methyl-1,3,6-tetrahydrophthalic anhydride, itaconic acid, mesaconic acid, methylenemalonic acid, fumaric acid, citraconic acid, 2-acrylamido-2-methylpropanesulfonic acid, 3-allyloxy-2-hydroxy propane sulfonic acid, allyl phosphonic acid, allyloxybenzenesulfonic acid, 2-hydroxy-3-(2-propenyloxy)propanesulfonic acid, allylsulfonic acid, other acrylamidomethyl propane sulfonic acids, methallyl sulfonic acid, isopro-phenylsulfonic acid, vinylphosphonic acid, styrenesulfonic acid, vinylsulfonic acid, aspartic acid, hydroxamic acid, adipic acid, and the alkali metal or ammonium salts thereof; methyl acrylate, ethyl acrylate, butyl acrylate, n-hexyl acrylate, methyl methacrylate, ethyl methacrylate, butyl methacrylate, isobutyl methacrylate, t-butylaminoethyl methacrylate, diethylaminoethyl acrylate, hydroxyethyl methacrylate, hydroxyethyl acrylate, hydroxypropyl acrylate, hydroxypropyl methacrylate, diethylaminoethyl methacrylate, dimethylaminoethyl methacrylate, dimethylaminoethyl acrylate, tertiary butylacrylate, polyethyleneglycol monomethacrylate, phosphoethyl methacrylate, and vinyl acetate; acrylamide (or 2-propenamide), methacrylamide, ethyl acrylamide, propyl acrylamide, N-t-butylacrylamide, tertiary butyl methacrylamide, tertiary octyl acrylamide, N-methylacrylamide, N,N-dimethylacrylamide (or N,N-dimethyl-2-propenamide), dimethylaminopropyl methacrylamide, cyclohexyl acrylamide, benzyl methacrylamide, vinyl acetamide, sulfomethylacrylamide, sulfoethylacrylamide, 2-hydroxy-3-sulfopropyl acrylamide, sulfophenylacrylamide, N-vinyl formamide, N-vinyl acetamide, 2-hydroxy-3-sulfopropyl acrylamide, N-vinyl pyrrolidone (a cyclic amide), 2-vinylpyridene, 4-vinylpyridenem and carboxymethylacrylamide; maleic anhydride (or 2,5-furandione) and succinic anhydride; acrylonitrile and methacrylonitrile; acrylamidopropyltrimethylammonium chloride, diallyldimethylammonium chloride, and methacrylamidopropyltrimethylammonium chloride; 1,2-dihydroxy-3-butene, allyl alcohol, ethylene glycoldiacrylate, 2-ethyl-oxazoline, diethylenetriamine, ethylene oxide, propylene oxide, ammonia, styrene, ethylene diamine, dimethylamine, diallyl phthalate, polyethylene glycol monomethacrylate, sodium styrene sulfonate, an alkoxylated allyl alcohol sulfonate or mixtures thereof.

In one embodiment, an illustrative example of an alkoxylated allyl alcohol sulfonate comprises the following structure:

where $R^1$ is a hydroxyl substituted alkyl or alkylene radical having 1 to about 10 carbon atoms, or a non-substituted alkyl or alkylene radical having 1 to about 10 carbon atoms, or is $-(CH_2-CH_2-O)_n-$, $-[CH_2-CH(CH_3)-O]_n-$, or a mixture of both, wherein 'n' is an integer from about 1 to about 50; $R^2$ is H or a lower alkyl ($C_1$-$C_3$) group; X, when present, is an anionic radical selected from the group consisting of $-SO_3$, $-PO_3$, $-PO_4$, $-COO$; and Y, when present, is H or any water soluble cation or cations which together counterbalance the valance of the anionic radical; and a is 0 or 1. In one embodiment, a=1.

Suitable water soluble polyelectrolyte polymer dispersants (b) may, in one embodiment, have a molecular weight (MW) of from 200 to 200,000 Daltons. In another embodiment, suitable water soluble polyelectrolyte polymer dispersants (b) will have a molecular weight (MW) from about 500 to 20,000 Daltons.

Illustrative water soluble polyelectrolyte polymer dispersants (b) include polycarboxylates such as (1) polyacrylic acids or polyacrylates, acrylate based polymers, copolymers, terpolymers, and quadpolymers such as acrylate/acrylamide copolymers, acrylate/AMPS (acrylamido methylene sulfonic acid or 2-acrylamido-2-methyl-1-propanesulfonic acid) or acrylamidoalkane sulfonic acid copolymers, acrylate/sulfonate copolymers, acrylate/hydroxyalkyl acrylate copolymers, acrylate/alkyl acrylate copolymers, acrylate/AMPS/alkyl acrylamide terpolymers, acrylate/acrylamidoalkane sulfonic acid/styrene sulfonic acid (or water soluble salts) terpolymers, acrylate/acrylamide/sulfoalkylacrylamide terpolymers, acrylic acid/allyloxy-2-hydroxypropylsulfonic acid(AHPSE)/polyethyleneglycol allyl ether terpolymer, acrylate/methacrylate methyl ester/2-propane-1-sulfonic acid, 2-methyl-, sodium salt/bezenesulfonic acid, 4-[(2-methyl-2-propenyl)oxy]-, sodium salt quadpolymers; (2) polymethacrylic acids or polymethacrylates, methacrylate based polymers, copolymers, terpolymers, and quadpolymers, where one monomer of the corresponding acrylate based polymers listed in (1) is replaced by methacrylate or methacrylic acid; (3) polymaleic acid or maleic anhydride polymers, maleic acid based polymers, their copolymers, terpolymers and quadpolymers, where one monomer of the corresponding acrylate based polymers listed in (1) is replaced by maleic acid or maleic anhydride; (4) polyacrylamides, modified acrylamide based polymers, and acrylamide based copolymers, terpolymers and quadpolymers, where one monomer of the corresponding acrylate based polymers listed in (1) is replaced by acrylamide; (5) sulfonic acid based copolymers, terpolymers and quadpolymers or their water soluble salts; phosphonic acid based copolymers, terpolymers and quadpolymers or their water soluble salts; phosphinic acid based copolymers, terpolymers and quadpolymers or their water soluble salts; (6) vinylpyrrolidone based homopolymers, and copolymers; (7) alkylene oxide based copolymers and terpolymers; and combinations comprising one or more of the foregoing.

The water soluble polymer may also be either a polyether polyamino methylene phosphonate as described in U.S. Pat. No. 5,338,477 or a phosphino polyacrylate acid.

Specific examples of the commercially available polymers suitable for use as water soluble polyelectrolyte polymer dispersants (b) include the following:

1. Polymers supplied by Noveon (or Lubrizol): Good-Rite® K-700 series polymers

| Good-Rite ® Polymer Technical Data Sheet | Chemical Type | Nominal Molecular Weight | pH | Total Solids | Active Solids |
|---|---|---|---|---|---|
| K-702 | PAA | 240,000 | 2.5 | 25% | 24.70% |
| K-7028 | PAA | 2,000 | 3.6 | 55% | 51.70% |
| K-7058 | PAA | 5,000 | 2.5 | 50% | 49.20% |
| K-7058N | NaPAA | 5,000 | 7 | 45% | 35.70% |
| K-7058D | NaPAA | 5,000 | 7.5* | 100%** | 70% |
| K-7600N | NaPAA | 60,000 | 8.2 | 33% | 25.70% |
| K-732 | PAA | 5,000 | 2.6 | 50% | 49.50% |
| K-739 | NaPAA | 5,000 | 7.5* | 100%** | 70.10% |
| K-752 | PAA | 2,000 | 2.6 | 63% | 62.20% |
| K-759 | NaPAA | 2,000 | 7.5* | 100%** | 71.50% |
| K-765 | NaPMAA | 30,000 | 7 | 30% | 24.30% |
| K-766 | NaPMAA | 5,000 | 7 | 40% | 30.10% |
| K-776 | AA/SA | N.P. | 4.8 | 37% | 30.60% |
| K-775 | AA/SA | N.P. | 3.5 | 50% | 48% |
| K-781 | AA/SA/SS | N.P. | 2.8 | 55% | 52.80% |
| K-797 | AA/SA/SS | N.P. | 2.7 | 50% | 48.50% |
| K-797D | Na(AA/SA/SS) | N.P. | 8.2* | 100%** | 74.30% |
| K-798 | AA/SA/SS | N.P. | 2.8 | 50% | 48% |
| K-XP212 | Proprietary | N.P. | 4 | 40% | 39.20% |

PAA = Polyacrylate,
NaPAA = Sodium Polyacrylate,
NaPMAA = Sodium Polymethacrylate
AA = Acrylic Acid,
SA = Sulfonic Acid or AMPS,
SS = Sodium Styrene Sulfonate
'Active Solids' = 'Total Solids' − 'Counter Ions' (sodium) from post polymerization neutralization with NaOH
*pH of a 1% solution
**Includes moisture content
N.P. Not published 2. Polymers available from Alco Chemical (or National Starch and Chemical Co.), including:

| ALCO AQUATREAT INDUSTRIAL WATER TREATMENT PRODUCTS TYPICAL PROPERTY | | | |
|---|---|---|---|
| Product | Total Solids | pH | Mw |
| Polyacrylic Acid | | | |
| AR-4 | 25 | 2.1 | 60000 |
| AR-6 | 25 | 2.3 | 100000 |
| AR-260 | 50 | 3.2 | 2000 |
| AR-602A | 50 | 2.8 | 4500 |
| AR-900A[1] | 50 | 2.9 | 2600 |
| AR-921A | 50 | 2.6 | 3000 |
| AR-935 | 35 | 3.5 | 2500 |
| Sodium Polyacrylate | | | |
| AR-602N[1] | 45 | 7.5 | 4500 |
| AR-636 | 45 | 7.5 | 5000 |
| AR-900[1] | 33 | 5.5 | 2600 |
| AR-940[1] | 40 | 8.3 | 2600 |
| Sodium Polymethacrylate | | | |
| AR-231[1] | 30 | 8.5 | 6500 |
| AR-232[1] | 30 | 8.5 | 9500 |
| AR-241 | 40 | 7 | 6500 |
| Copolymer | | | |
| AR-335 | 49 | 7.2 | 3400 |
| AR-540[1] | 44 | 4.3 | 10000 |
| AR-545 | 44 | 4.4 | 5000 |
| AR-546 | 37 | 4.8 | 9900 min |
| AR-978 | 42 | 5 | 4500 |
| AR-980[1] | 41 | 6.4 | 2800 |
| Sulfonated Styrene Maleic Anhydride | | | |
| VERSA-TL 3 | 95 | 7 | 20000 |
| VERSA-TL 4 | 25 | 7 | 20000 |

AR-335 is polyacrylamide;

AR-545 and AR-546 are AA/AMPS copolymers;

Aquatreat AR-540 is an Acrylic acid (AA)/2-propenoic acid, 2-methyl, methyl ester/benzenesulfonic acid, 4-[(2-methyl-2-propenyl)oxy]-, sodium salt/2-propene-1-sulfonic acid, 2-methyl-, sodium salt terpolymer.

Versa TL-4 = sulfonated styrene/maleic anhydride copolymer.

Versa TL-3 is the dry form of Versa TL-4.

AR-978 is acrylic acid/maleic acid copolymer.

AR-980 is an acrylic acid/maleic acid/Non ionic monomer terpolymer.

3. Polymers available from Rohm & Haas, including:

| Product Name | Chemical Nature | Molecular Weight | % Solids | pH |
|---|---|---|---|---|
| Polyacrylates | | | | |
| Acumer ® 1000/ Optidose ™ 1000 | Polyacrylic acid and its Na salts | 2,000 | 47–49 | 3.2–4.0 |
| Acumer 1020 | Polyacrylic acid | 2,000 | 39–41 | 2.1–2.5 |
| Acumer 1100 | Polyacrylic acid and its Na salts | 4,500 | 47–49 | 3.2–4.0 |
| Acumer 1110 | Polyacrylic acid and its Na salts | 4,500 | 44–46 | 6.7 |
| Acumer 1050 | Polyacrylic acid and its Na salts | 2,000–2,300 | 47–49 | 3.2–4.0 |
| Acumer 1510 | Na Salt of Polycarboxylate | 60,000 | 24–26 | 2 |
| Acumer 1808 | Na Salt of Polycarboxylate | 30,000 | 21–22 | 3.5–5.0 |
| Acumer 1850 | Na Salt of Polycarboxylate | 30,000 | 29–31 | 9.0–10.8 |
| Acumer 2000/ Optidose 2000 | Modified Polycarboxylate | 4,500 | 42.5–43.5 | 3.8–4.6 |
| Acumer 2100 | Copolymer | 11,000 | 36.5–37.5 | 4.3–5.3 |
| Acumer 3100/ Optidose 3100 | Carboxylate/Sulfonate/Nonionic Terpolymer | 4,500 | 43–44 | 2.1–2.6 |
| Acumer 4161 | Phosphinopolycarboxylic Acid | 3,300–3,900 | 46–48 | 3.0–3.5 |
| Optidose 4210 | Polymaleic Acid | 500–1,000 | 50 | 1.0–2.0 |
| Acumer 5000 | Proprietary Polymer | 5,000 | 44.5–45.5 | 2.1–2.6 |
| Tamol ® 850 | Na Salt of Polycarboxylate | 30,000 | 29–31 | 9.0–10.8 |
| Tamol 731A | Maleic Anhydride Na Salt Copolymer | 15,000 | 24–26 | 9.5–10.5 |
| Tamol 960 | Na Salt of Polycarboxylate | 5,000 | 39–41 | 8–9 |

Note:
Acumer 2000 and 2100 are carboxylic acid/sulfonic acid copolymers, i.e., AA/AMPS copolymers;
Acumer 3100 and Acumer 5000 are acrylic acid/t-butyl acrylamide/2-acrylamido-2-methyl propane sulfonic acid terpolymers.
Optidose 1000, 2000 and Optidose 3100 are tagged versions of Acumer 1000, 2000, and 3100, respectively.

In one exemplary embodiment, water soluble polyelectrolyte polymer dispersant (b) will be selected from polymers such as the ones available from (1) BASF under the Sokalan and Tamol brands, e.g., Sokalan CP 9 (maleic acid based polymer), Sokalan CP 10, 10S, 12S (all are acrylate based polymers), 13S, Sokalan HP 22 G, HP 25, HP 59 and HP165 (polyvinylpyrrolidone), Solakan PA 15, PA 20, PA 25 C1, PA 30 C1, PA 40, Sokalan PM 10 I, PM 70, Tamol VS, and other similar products; (2) Cytec under the Cyanamer brand, e.g., P-35, P-70, P-80, A-100L and A-15 (all are acrylate or acrylamide based polymers or copolymers) and the like; (3) Biolab additives under the Bleclene and Belsperse brands, e.g., Beclene 200 (maleic acid homopolymer), 283 (maleic acid terpolymer), 400 (sulfonated phosphino polycarboxylic acid) and 499 (sulfonated phosphono polycarboxylic acid); and Belsperse 161 (phosphino polycarboxylic acid) and 164 (phosphino polycarboxylic acid) and the like and (4) Water soluble polymeric products from Nalco (e.g., acrylic acid/2-acrylamido-2-methylpropyl sulfonic acid copolymers, polyether polyamino phosphonate as described in U.S. Pat. No. 5,338,477, and acrylic acid/acrylamide/acrylamidomethanesulfonic acid terpolymers), GE Betz (e.g., acrylic acid/polyethyleneglycol allyl ether copolymers, acrylic acid/allyloxy-2-hydroxypropylsulfonic acid (or AHPSE)/polyethyleneglycol allyl ether terpolymers, and acrylic acid/AHPSE copolymers), Chemtreat [e.g., allyoxybenzenesulfonic acid (~3.5 mole %)/methallyl sulfonic acid (~2.5 mole %)/methyl methacrylate (13-18 mole %)/acrylic acid (76-81 mole %) quadpolymers], Ciba, SNF Floerger, Rhone-Poulenc, Stockhausen, Hercules, Henkel, Allied Colloids, Hoechst Celanese, Ashland Chemical Company, Kurita Water Indsutries Ltd, Nippon Shokubai Co., and other suppliers.

Additional water soluble polymers (b) which can be utilized herein, but are not limited to, are those disclosed in (or E.U. Patent) U.S. Pat Nos. 3,085,916; 3,578,589; 3,709,815; 3,806,367; 4,499,002; 4,510,059; 4,532,048; 4,563,284; 4,566,973; 4,566,974; 4,640,793; 4,707,271; 4,762,621; 4,784,774; 4,885,097; 4,952,326; 4,952,327; 5,023,001; 5,658,465; 6,361,768B1; 4,556,493; 4,581,145; 4,457,847; 4,703,092; 4,801,388; 4,919,821; 4,929,425; 5,035,806; 5,049,310; 5,080,801; 5,128,419; 5,167,828; 5,171,459; 5,213,691; 5,216,086; 5,260,386; 5,422,408; 5,403,493; 5,534,611; 5,726,267; 5,736,405; 5,776,875; 5,750,070; 5,788,866; 5,858,244; 5,876,623; 6,005,040; 6,017,994; 6,022,401; 6,153,106; 6,225,430B1; 6,232,419B1; 6,312,644B1; 6,344,531B1; 6,380,431B1; 6,426,383B1; 6,440,327B1; 6,461,518B1; 6,645,428B1; 7,115,254B1; 4,443,340; 4,659,480; 4,659,482; 4,913,822; 4,929,362; 4,929,695; 4,931,206; 4,944,885; 5,030,748; 5,078,891; 5,100,558; 5,102,555; 5,108,619; 5,128,427; 5,139,643; 5,147,555; 5,158,622; 5,158,685; 5,169,537; 5,180,498; 5,194,620; 5,211,845; 5,234,604; 5,248,438; 5,242,599; 5,256,302; 5,264,155; 5,271,847; 5,271,862; 5,282,905; 5,320,757; 5,332,505; 5,342,540; 5,350,536; 5,374,336; 5,378,327; 5,378,372; 5,393,456; 5,445,758; 5,512,183; 5,518,630; 5,527,468; 5,575,920; 5,601,754; 6,228,950B1; 6,444,747B1; 6,641,754B2; 4,517,098; 4,530,766; 4,711,725; 5,055,540; 5,071,895; 5,185,412; 5,223,592; 5,277,823; 5,342,787; 5,395,905; 5,401,807; 5,420,211; 5,451,644; 5,457,176; 5,516,432; 5,531,934; 5,552,514; 5,554,721; 5,556,938; 5,597,509; 5,601,723; 5,658,464; 5,755,972; 5,866,664; 5,929,098; 6,114,294; 6,197,522B1; 6,207,780B1; 6,218,491B1; 6,251,680B1; 6,335,404B1; 6,395,185; 5,023,368; 5,547,612; 5,650,473; 5,654,198; 5,698,512; 5,789,511; 5,866,012; 5,886,076; 5,925,610; 6,040,406; 6,995,120B2; 7,087,189B2; 5,346,626; 5,624,995; 5,635,575; 5,716,529; 5,948,268; 6,001,264; 6,162,391; 6,368,552B1; 6,656,365B2; 6,645,384B1; 5,000,856; 5,078,879; 5,087,376; 5,124,046; 5,153,390; 5,262,061; 5,322,636; 5,338,477; 5,378,368; 5,391,303; 5,407,583; 5,454,954; 5,534,157; 5,707,529; 6,691,715B2; 6,869,998B2; 4,372,870; 5,124,047; 4,797,224; 4,485,223; 5,254,286; 4,460,477; 5,015,390; 4,933,090; 4,868,263;

4,895,664; 4,895,916; 5,000,856; 4,900,451; 4,584,105; 4,872,995; 4,711,726; 4,851,490; 4,849,129; 4,589,985; 4,847,410; 4,657,679; 4,801,387; 4,889,637; 4,604,211; 4,710,303; 4,589,985; 4,324,664; 3,752,760; 4,740,314; 4,647,381; 4,836,933; 4,814,406; 4,326,980; 4,008,164; 5,246,332; 5,187,238; EP0,297,049B1; EP0360746B1; and EP0,879,794B1 (note: Only the last three patents in this list are E.U. patents. Other patents are U.S. patents), hereby incorporated by reference.

Furthermore, additional water soluble polymers which can be utilized herein, but are not limited to, are those disclosed in U.S. patent application Nos. 2006/0191852A1; 2005/0202995A1; 2002/0195583A1; 2004/00225093A1; 2005/0009959A1; and 2005/0092211A1, U.S. Pat. No. 4,372,870; EP0360746B1; U.S. Pat. Nos. 5,124,047; 4,797,224; 4,485,223; 5,254,286; 4,460,477; 5,015,390; 4,933,090; 4,868,263; 4,895,664; 4,895,916; 5,000,856; 4,900,451; 4,584,105; 4,872,995; 4,711,726; 4,851,490; 4,849,129; 4,589,985; 4,847,410; 4,657,679; 4,801,387; EP0,297,049B1; U.S. Pat. Nos. 4,889,637; 4,604,211; 4,710,303; 4,589,985; 4,324,664; 3,752,760; 4,740,314; 4,647,381; 4,836,933; 4,814,406; 4,326,980; 4,008,164; 5,246,332; 5,187,238, hereby incorporated by reference.

In one embodiment, the water soluble polyelectrolyte polymer dispersants (b) may be present in the disclosed magnesium corrosion inhibiting compositions in an amount of from 0.001 to 50.0 weight %, based on the weight of the magnesium corrosion inhibiting composition.

In one embodiment, the water soluble polyelectrolyte polymer dispersants (b) will be present in a heat transfer fluid employing the disclosed corrosion inhibiting composition in a concentration of about 0.005% to 10% by weight, based on the total weight of the heat transfer fluid. In another embodiment, the water soluble polyelectrolyte polymer dispersant (b) will be present in a heat transfer fluid employing the disclosed corrosion inhibiting composition in a concentration of about 0.05% to 5% by weight, based on the total weight of the heat transfer fluid. In one exemplary embodiment, the water soluble polyelectrolyte polymer dispersant (b) will be present in a heat transfer fluid employing the disclosed corrosion inhibiting composition in a concentration of about 0.07% to 2% by weight, based on the total weight of the heat transfer fluid.

In one exemplary embodiment, the disclosed magnesium corrosion inhibiting compositions will further comprise, in addition to components (a) and (b) above, and component (d) below, a component (c).

In one embodiment, component (c) will be at least one tricarboxylic or tetracarboxylic acid.

Illustrative examples of suitable components (c) include one or more aliphatic tricarboxylic acids such as citric acid, 2-butane-1,2,4-tricarboxylic acid and the like, one or more aliphatic tetracarboxylic acids such as 1,2,3,4-alkane tetracarboxylic acids such as 1,2,3,4-butane tetracarboxylic acid and the like; as well as combinations comprising at least one of the foregoing. The water soluble salts, esters, or anhydrides of the aliphatic tricarboxylic or tetracarboxylic acids can also be used.

In one exemplary embodiment, the tri or tetra carboxylic acid (c) will be at least one of the $C_4$ to $C_{20}$ aliphatic tetracarboxylic acids where the carboxylic groups are located at 1,2,3,4 positions. In one exemplary embodiment, the tetra carboxylic acid (c) will be a tetracarboxylic acid such as 1,2,3,4-butane tetracarboxylic acid, 1,2,3,4-pentane tetracarboxylic acid, 1,2,3,4-hexane tetracarboxylic acid or the like, as well as combinations comprising at least one of the foregoing.

In one embodiment, the tricarboxylic acids (c) are $C_3$ to $C_{24}$ aliphatic tricarboxylic acids or the corresponding anhydrides without or with at least one additional hydroxyl group in the aliphatic chains. In one exemplary embodiment, the tricarboxylic acids (c) will be at least one of citric acid, 3-hydroxy-1,3,4-alkane ($C_4$ to $C_{20}$ alkane) tricarboxylic acid, 2-(2-carboxyethyl)-3-decyl maleic anhydride, cyclohexenoic tricarboxylic acids (e.g., Tenax 2010, Tenax WS5560 and Tenax WS5520 from Westavaco or other suppliers) and the like, as well as combinations comprising at least one of the foregoing.

In one especially exemplary embodiment, the component (c) will be a tetra carboxylic acid as described above.

In one embodiment, the tricarboxylic or tetracarboxylic acid (c) may be present in the disclosed magnesium corrosion inhibiting compositions in an amount of from 0.001 to 20.0 weight %, based on the weight of the magnesium corrosion inhibiting composition.

The amount of the tricarboxylic or tetracarboxylic acid (c) present in a heat transfer fluid employing the disclosed magnesium corrosion inhibiting composition is about 0.001% to 5%, by weight, based on the total weight of the heat transfer fluid. In another embodiment, the amount of the tri or tetra carboxylic acid (c) will be present in the magnesium corrosion inhibiting composition in an amount such that the tri or tetra carboxylic acid (c) is present in the heat transfer fluid in an amount of from about 0.025% to about 2% by weight, based on the total weight of the heat transfer fluid. In one exemplary embodiment, the amount of the tri or tetra carboxylic acid (c) will be present in the magnesium corrosion inhibiting composition in an amount such that the tri or tetra carboxylic acid (c) is present in the heat transfer fluid in an amount of from about 0.05% to about 2% by weight, based on the total weight of the heat transfer fluid.

In another exemplary embodiment, the disclosed magnesium corrosion inhibiting compositions will further comprise, in addition to components (a) and (b) above, a component (d). Thus, it will be appreciated that components (a), (b) and (d) will generally be present in all embodiments of the disclosed magnesium corrosion inhibiting compositions while all other components are optional with regards to the broadest embodiment of the disclosed magnesium corrosion inhibiting composition.

In one embodiment, required component (d) will comprise at least one of a $C_4$-$C_{22}$ aliphatic or aromatic mono- or dicarboxylic acid; a silicate and at least one of a silicone or a silicate stabilizing siloxane compound; or a combination comprising at least one of the foregoing.

In one exemplary embodiment of the disclosed magnesium corrosion inhibiting compositions, the component (d) will further comprise one or more members selected from the group consisting of a $C_4$-$C_{22}$ aliphatic or aromatic mono- or dicarboxylic acid, a fluoride, spiculisporic acid, a molybdate, a triazole, thiazole or other azole compound, a phosphonate, a phosphinate, an amine salt, a borate or combinations comprising at least one of the foregoing.

In one embodiment, component (d) may be present in the disclosed magnesium corrosion inhibiting compositions in an amount of from 0.01 to 40.0 weight %, based on the weight of the magnesium corrosion inhibiting composition.

In one embodiment, component (d) will comprise at least one azole compound present in an amount of from 0.03 wt % to 1 wt % (based on the weight of the heat transfer fluid), one silicate present in an amount of from 30 ppm to 2000 ppm in equivalent Si concentration, and one silicate stabilizing silicone such as Silquest Y-5560 silane (i.e., polyalkyleneoxidealkoxysilane), sodium(trihydroxysilyl)-propylmethylphosphonate or an organic phosphosilicone compound (i.e., $O_{1.5}Si\text{—}C_3H_6\text{—}P(O)(O^-Na^+)(OC_2H_5)$) such as disclosed in U.S. Pat. No. 4,629,602. In one embodiment, the silicate/silicone ratio is between 20/1 to 1/2 by weight (or 20:1 to 1:2 mole ratio) in the heat transfer fluid. In one exemplary embodiment, component (d) will further comprise, addition to the a azole and silicate/silicone, a water soluble molybdate salt. In one embodiment, the water soluble molybdate salt will be present in an amount of about 0.2 wt % to 2 wt % is present, based on the weight of the heat transfer fluid.

In another exemplary embodiment, component (d) will comprise at least one azole compound (0.05 wt % to 1.5 wt %), at least one carboxylic acid (0.2 wt % to 5 wt %) chosen from the group of $C_6$-$C_{24}$ aliphatic or aromatic mono- or di-carboxylic acids, e.g., spiculisporic acid, and one water-soluble molybdate salt (0.2 wt % to 2 wt %), all based on the weight of the heat transfer fluid comprising the disclosed magnesium corrosion inhibitor.

In still another embodiment, any of the foregoing embodiments of component (d) will further comprise a fluoride compound. In one embodiment, the foregoing embodiment of component (d) will further comprise from 0.05 to 1 wt % of fluoride chosen from sodium fluoride, potassium fluoride or a mixture thereof, all based on the weight of the heat transfer fluid comprising the disclosed magnesium corrosion inhibitor.

Silicates suitable for use include inorganic silicates and organic silicates. Useful inorganic silicates are represented by the empirical formula:

$$(MO)_m SiO_{(4-n/2)}(OH)_l$$

where M is a monovalent cation that forms a glycol or water soluble silicate selected from the group consisting of sodium, potassium, lithium, rubidium and tetraorganoammonium cations, "m" has a value of 1 to 4 inclusive, "l" has a value from 0 to 3 inclusive, and "n" has a value from 1 to 4 inclusive, and which is equal to the sum of "m" and "l".

Useful organic silicates include silicate esters represented by the following formula:

$$Si(OR)_4$$

herein R is selected from the group consisting of $C_1$ to $C_{36}$ alkyl, aryl, alkoxyalkyl, alkoxyaryl, hydroxyalkoxy, and mixtures thereof. Particularly, a tetraalkylorthosilicate ester with the alkyl groups containing 1 to 20 carbon atoms (e.g., tetramethylorthosilicate, tetraethylorthosilicate, and the like) can be used. The silicate ester is present in the formulation in an amount of 0% to about 5% by weight, for example about 0.01 to about 5% by weight, based on the total weight of the heat transfer fluid.

Colloidal silica may also be included for use as a corrosion inhibitor in the instant composition. The colloidal silica has a nominal particle size between about 1 nm (nanometer) to about 200 nm. Preferably, the colloidal silica particle size is about 1 nm to about 100 nm. More preferably, the colloidal silica particle diameter is between about 1 nm to about 40 nm. Suitable colloidal silicas include Ludox colloidal silica from DuPont or Grace Davidson, Nyacol and/or Bindzil colloidal silica from Akzo Nobel-Eka Chemicals, Snowtex colloidal silica from Nissan Chemical, as well as colloidal silica from Nalco and other suppliers. Another benefit of using colloidal silica in the fluid is that the nanoparticles may increase heat transfer efficiency and/or heat capacity of the coolants. The colloidal silica is present in the formulation in an amount of 0 to about 10,000 ppm, and preferably, 1 to about 2000 ppm of the heat transfer fluid.

Illustrative examples of polymers useful as the silicates/silicone/siloxanes that may be used in component (d) include the phosphonate-silicate, sulfonate-silicate, carboxylate-silicate and siloxane-silicate copolymers heretofore employed in the prior art in silicate-containing antifreeze compositions. These copolymers may be preformed or can be formed in situ upon combination of a water-soluble silicate and a water-soluble phosphonate, sulfonate, or siloxane in an aqueous solution at ambient temperature, i.e., an organosilicone compound. These copolymers are generally referred to as "siloxane-silicate" copolymers in that each contains silicon in addition to the phosphonate, sulfonate, carboxylate, etc., moiety. These copolymers are believed to provide improved metal corrosion inhibition over the use of the simple metal silicates, since the siloxane-silicate copolymers substantially inhibit the gelation tendency of water soluble silicates at a pH of between 7 and about 11.

Other suitable silicones (or siloxane compounds) or siloxane-silicate copolymers which can be utilized herein include, but not limited to, those described in U.S. Pat. Nos. 3,341,469; 3,337,496; 3,312,622; 3,248,329; 3,198,820; 3,203,969; 4,093,641; 4,287,077; 4,333,843; 4,352,742; 4,354,002; 4,362,644; 4,370,255; 4,629,602; 4,701,277 and 4,772,408, and also in U.S. patent application no. 2006/0017044 A1, the contents of which are incorporated herein by reference thereto.

Exemplary siloxane based compounds also include Silwet siloxane surfactants from GE Silicones/OSi Specialties, such as Silwet L-77, Silwet L-7657, Silwet L-7650 Silwet L-7608, Silwet L-7210 and Silwet L-7220, as well other Silwet surfactants or other similar siloxane-polyether copolymers available from Dow Corning or other suppliers.

Other suitable silicones for use in component (d) include organosilane-based compounds comprising one or more silicon-carbon bonds that are capable of hydrolyzing in the presence of water to form silanols (i.e., compounds with one or more Si—OH groups), such as alkoxysilanes, e.g., sodium (trihydroxysilyl) propylmethylphosphonate, Formasil 891, Formasil 593, Formasil 433, Silquest® Y-5560 silane (i.e., polyalkyleneoxidealkoxysilane), Silquest® A-186 [2-(3,4-epoxycyclohexyl)ethyltrimethoxysilane], Silquest® A-187 (3-glycidoxypropyltrimethoxysilane), 3-aminopropyltriethoxysilane, N-2-(aminoethyl)-3-aminopropyltrimethoxysilane, octyltriethoxysilane, vinyltriethoxylsilane, vinyltrimethoxylsilane, methyltriethoxysilane, 3-methacryloxypropyltrimethoxysilane, 3-mercaptopropyltrimethoxysilane, isobutyltrimethoxysilane, phenyltrimethoxysilane, methyltrimethoxysilane, or other Silquest surfactants available from GE Silicones/OSi Specialties or other suppliers.

Mixtures of silicone compounds can be used in component (d). The silicone, when used, is present in an amount of about 0.01% to about 10% by weight, and preferably, about 0.02% to about 2% by weight, based on the total weight of the heat transfer fluid employing the disclosed magnesium corrosion inhibiting compositions.

Suitable copper and copper corrosion inhibitors that can be used in component (d) include compounds containing 5- or 6-member heterocyclic ring as the active functional group, wherein the heterocyclic ring contains at least one nitrogen atom, for example, an azole compound. Particularly, benzotriazole, tolyltriazole, methyl benzotriazole (e.g., 4-methyl benzotriazole and 5-methyl benzotriazole), butyl benzotriazole, and other alkyl benzotriazoles (e.g., the alkyl group contains from 2 to 20 carbon atoms), mercaptobenzothiazole, thiazole and other substituted thiazoles, imidazole, benzimidazole, and other substituted imidazoles, indazole and substituted indazoles, tetrazole and substituted tetrazoles, and mixtures thereof can be used. The copper and copper alloy corrosion inhibitors, when present, are used in an amount of about 0.01 to 4% by weight based on the total weight of the heat transfer fluid employing the disclosed magnesium corrosion inhibiting compositions.

Suitable examples of useful amine salts that can be used in component (d) include cyclohexenoic carboxylate compounds derived from tall oil fatty acids; and/or an amine such as mono-, di- and triethanolamine, morpholine, benzylamine, cyclohexylamine, dicyclohexylamine, hexylamine, AMP (or 2-amino-2-methyl-1-propanol or isobutanolamine), DEAE (diethylethanolamine), DEHA (diethylhydroxylamine), DMAE (2-dimethylaminoethanol), DMAP (dimethylamino-2-propanol), and MOPA (3-methoxypropylamine), or a mixture thereof.

A number of polydimethylsiloxane emulsion based antifoams can also be use as optional components in component (d). Illustrative examples include PC-5450NF from Performance Chemicals, LLC in Boscawen, N.H.; CNC antifoam XD-55 NF and XD-56 from CNC International in Woonsocket in R.I., and/or copolymers of ethylene oxide (EO) and propylene oxide (PO), such as Pluronic L-61 from BASF; SAG 10 or similar products available from OSI Specialties, Dow Corning or other suppliers; an ethylene oxide-propylene oxide (EO-PO) block copolymer and a propylene oxide-ethylene oxide-propylene oxide (PO-EP-PO) block copolymer (e.g., Pluronic L61, Pluronic L81, or other Pluronic and Pluronic C products); poly(ethylene oxide) or poly(propylene oxide), e.g., PPG 2000 (i.e., polypropylene oxide with an average molecular weight of 2000); a hydrophobic amorphous silica; a polydiorganosiloxane based product (e.g., products containing polydimethylsiloxane (PDMS), and the like); a fatty acids or fatty acid ester (e.g., stearic acid, and the like); a fatty alcohol; an alkoxylated alcohol and a polyglycol; a polyether polyol acetate, a polyether ethoxylated sorbital hexaoleate, and a poly(ethylene oxide-propylene oxide)monoallyl ether acetate; a wax, a naphtha, kerosene and an aromatic oil; and combinations comprising one or more of the foregoing antifoam agents.

In addition to components (a), (b) and (d), the disclosed magnesium corrosion inhibiting compositions may optionally comprise other components as described below.

For example, the disclosed magnesium corrosion inhibiting compositions may optionally comprise a metal ion (e). In one embodiment, suitable metal ions (e) are those derived from a water soluble salt. In one embodiment, suitable metal ions are those selected from calcium, magnesium, strontium, zinc, or a combination comprising one of the foregoing.

In one exemplary embodiment, the disclosed magnesium corrosion inhibiting compositions will comprise a metal ion (e). In one exemplary embodiment, the metal ion (e) will be formed from a water soluble calcium salt.

The water soluble metal ion (e) may be present in the disclosed corrosion inhibiting compositions in an amount of from 0 to 0.2 weight percent, based on the weight of the corrosion inhibiting composition.

If present, the water soluble metal ion (e) is present in a concentration in the range of about 0.1 mg/l to about 100 mg/l, based on the total heat transfer fluid employing the disclosed magnesium corrosion inhibiting compositions.

In addition, the disclosed magnesium corrosion inhibiting compositions may optionally comprise an additive (f) such as those that may be optionally added directly to a heat transfer fluid. Illustrative examples of suitable additives f) include those selected from the group of an antifoaming agent or defoamer, a dispersant, a scale inhibitor, a surfactant, a colorant, a wetting agent, a biocide, a non-ionic dispersant, and/or other coolant additives known in the art.

The additive (f) may be present in the disclosed corrosion inhibiting compositions in an amount of from 0 to 20.0 weight percent, based on the weight of the corrosion inhibiting composition.

The disclosed corrosion inhibiting compositions will be employed in the instant heat transfer compositions in an amount of from 0.001% to 50% by weight, based on the weight of the heat transfer fluid.

In practice, manufacture of the heat transfer fluids is by blending using means known in the art. Before, during, or after combinatioon, the pH of the fluids can be adjusted, using, for example a pH adjusting agent such as an acid or a base chosen from $HNO_3$, $H_3PO_4$, mono-or dicarboxylic acids, Borax, NaOH, KOH, phosphonic acids such as 2-butane-1,2,4-tricarboxylic acid, and the like. In one embodiment, the pH adjusting agent is used to adjust the pH of the 50 vol % of the heat transfer fluid to between 6.5 and 11.5.

The disclosed heat transfer fluids will generally have high conductivity. The conductivity of the 50 wt % coolants disclosed herein generally have a conductivity of greater than greater than 800 uS/cm, some greater than 1000 uS/cm.

Figure 1:
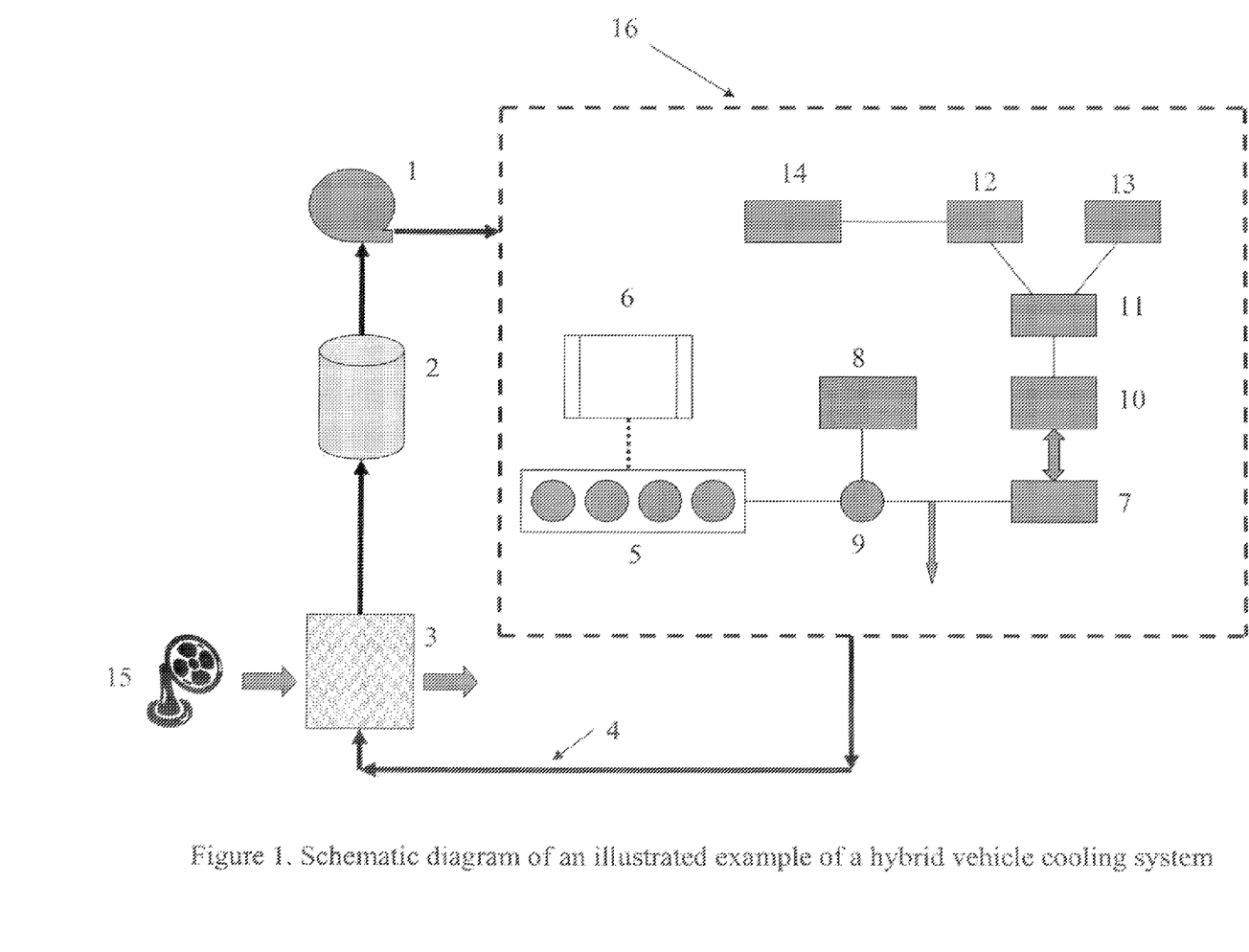
FIG. 1 is a schematic diagram of one embodiment of the disclosed cooling system (or heat transfer system) in a vehicle.

As illustrative example of the disclosed heat transfer system or assembly may be seen in FIG. 1. The major components of the cooling system, and the main system components 16 that may require the use of coolant or heat transfer fluid as cooling media are shown in FIG. 1. As indicated therein, the assembly may contain internal combustion engine 5, or fuel cells 5 or solar cells 5 as the vehicle primary power source 7. It also contains a rechargeable secondary battery 12 or an optional ultra-capacitor 13 that may be charged via the vehicle regenerative braking system. In this embodiment, the battery 12 and/or the ultra-capacitor 13 may act as secondary power sources. The assembly may also contain power electronic devices, such as DC/DC converters 10, DC/AC inverters 10, generators 8, power splitting devices 9, and/or voltage boost converters 11, etc. In addition, the assembly may also contain fuel cell or solar cell "balance of plant" subsystems 6. These may be air compressors, pumps, power regulators, etc. The assembly also contain HAVC systems 14, e.g., air-conditioning system for the climate control of vehicle interior space. These are included in the vehicle system 16 in the illustrated assembly of FIG. 1 that may require the use of coolant or heat transfer fluid for temperature control. Similar to other vehicle cooling systems, the assembly in the illustrate example also contain a coolant recirculation pump 1, coolant flow path 4, coolant tank 2, and a radiator or heat exchanger 3, and a fan 15. The fan may be substituted by an external cooling source, e.g., a different (or isolated) cooling system with its own cooling media.

It will be appreciated that any of the components illustrated in FIG. 1 may comprise magnesium or a magnesium alloy in whole or in part. In one exemplary embodiment, the disclosed heat transfer fluids will be in contact with a components that is comprised, in whole or in part, of magnesium or a magnesium alloy. In one especially exemplary embodiment, the disclosed heat transfer fluid will be in direct contact with a component surface containing magnesium or a magnesium alloy.

The invention is further illustrated by experimental data showing the benefits of using the instant invention as described below.

Tables 1 and 2 show the modified ASTM D1384 and D4340 test results of various silicate based or organic acid based coolant formulations described in the instant invention as well as the comparison example formulation.

In Table 1 and 2, Aquatreat AR-335 is a polyacrylamide polymer, AR-900 is a polyacrylic acid neutralized with sodium hydroxide, Aquatreat AR-540 is an Acrylic acid (AA)/2-propenoic acid, 2-methyl, methyl ester/benzenesulfonic acid, 4-[(2-methyl-2-propenyl)oxy]-, sodium salt/2-propene-1-sulfonic acid, 2-methyl-, sodium salt terpolymer, and Versaflex is a polycarboxylate, all available from Alco Chemical, Chattanooga, Tenn. Further in Table 1, Acumer 3100 is an Acrylic acid/AMPS (i.e., 2-acrylamido-2-methyl propane sulfonic acid)/tbutyl acrylamide terpolymer and Acumer 5000 is an acrylic acid/t-butyl acrylamide/2-acrylamido-2-methyl propane sulfonic acid terpolymer, both available from Rohm and Haas, Philadelphia, Pa.

TABLE 1

Mg Protective Test Coolant Formulations - Silicate Based Technology

| Mg Protective Test Coolant ID Ingredient | Si #1 WT % | Fluid A WT % | Fluid B WT % | Si #2 WT % | Fluid C WT % | Fluid D WT % | Fluid E WT % | Fluid F WT % |
|---|---|---|---|---|---|---|---|---|
| Ethylene Glycol | 95.1440 | 94.6706 | 94.9126 | 95.1770 | 95.1770 | 94.2580 | 94.7601 | |
| Deionized Water | 1.9581 | 1.9484 | 1.9533 | 1.5844 | 1.5844 | 1.9399 | 1.5775 | |
| Borax, 5 mol | 0.3975 | 0.3955 | 0.3965 | 0.3000 | 0.3000 | 0.3938 | 0.2987 | |
| NaOH, 50% | 1.0528 | 1.0476 | 1.1837 | 0.0313 | 0.0313 | 1.1718 | 0.1606 | |
| KOH, 45% | | | | 1.3777 | 1.3777 | | 1.3717 | |
| H3PO4, 75% | 0.6602 | 0.6569 | 0.6586 | 0.6000 | 0.6000 | 0.6541 | 0.5974 | |
| Silquest Y-5560 silane, $CH_3(CH_2CH_2O)_7C_3H_6Si(OCH_3)_3$ | 0.0775 | 0.0771 | 0.0773 | 0.0364 | 0.0364 | 0.0768 | 0.0362 | |
| Sodium silicate | 0.3847 | 0.3828 | 0.3838 | 0.1601 | 0.1601 | 0.3811 | 0.1594 | |
| Sodium Tolytriazole, 50% | 0.1165 | 0.1159 | 0.1162 | 0.1100 | 0.1100 | 0.1154 | 0.1095 | |
| Sodium Nitrate | 0.2000 | 0.1990 | 0.1995 | 0.2000 | 0.2000 | 0.1981 | 0.1991 | |
| Uranine Dye | 0.0020 | 0.0020 | 0.0020 | 0.0034 | 0.0034 | 0.0020 | 0.0034 | |
| Alizarine dye | | | | 0.0030 | 0.0030 | | 0.0030 | |
| Polypropylene glycol 2000 (or PPG-2000) | 0.00067 | 0.00067 | 0.00067 | 0.00067 | 0.00067 | 0.00066 | 0.00067 | |
| n-Propanol | 0.0060 | 0.0060 | 0.0060 | 0.0060 | 0.0060 | 0.0059 | 0.0060 | |
| Poly(oxyethylene/oxypropylene) monobutyl ether | 0.00003 | 0.00003 | 0.00003 | 0.00003 | 0.00003 | 0.00003 | 0.00003 | |
| $Na_2MoO_4$, 41.1% | | 0.4975 | | 0.3000 | 0.3000 | 0.4953 | 0.2987 | |
| Sodium Mecaptobenzothiazole, 50% | | | | 0.1100 | 0.1100 | | 0.1095 | |
| 1,2,3,4-Butane tetracarboxylic acid | | | 0.0998 | | | 0.0991 | 0.0996 | |
| $Ca(NO_3)_2*4H_2O$ | | | 0.0020 | | | 0.0020 | 0.0020 | |
| $Mg(NO_3)_2*6H_2O$ | | | 0.0080 | | | 0.0079 | 0.0080 | |
| Alco AR-335, 49% solid PAM, 3400 Mw | | | | | | 0.1981 | 0.0996 | |
| Alco AR-900, 33% solid Na-PAA, 2600 Mw | | | | | | | | |
| Alco Versaflex One | | | | | | | 0.0996 | |
| Alco Aquatreat AR-540, 44% solid AA copolymer | | | | | | | | |
| Rohm & Haas Acumer 3100, 43.5% solid AA terpolymer | | | | | | | | |
| Rohm & Haas Acumer 5000, 45% solid AA terpolymer | | | | | | | | |
| Potassium Fluoride, 40% w/v | | | | | | | | |
| Total | 100.000 | 100.000 | 100.000 | 100.000 | 100.000 | 100.000 | 100.000 | |

| Mg Protective Test Coolant ID Ingredient | Fluid G WT % | Fluid H WT % | Fluid I WT % | Fluid J WT % | Fluid K WT % | Fluid L WT % |
|---|---|---|---|---|---|---|
| Ethylene Glycol | 93.7934 | 93.2942 | 93.0107 | 93.0061 | 93.0015 | 93.4933 |
| Deionized Water | 1.9303 | 1.9200 | 1.9142 | 1.9141 | 1.9140 | 1.9241 |
| Borax, 5 mol | 0.3919 | 0.3898 | 0.3886 | 0.3886 | 0.3885 | 0.3906 |
| NaOH, 50% | 1.2646 | 1.3015 | 1.3680 | 1.3729 | 1.3778 | 1.3137 |
| KOH, 45% | | | | | | |
| H3PO4, 75% | 0.6508 | 0.6474 | 0.6454 | 0.6454 | 0.6453 | 0.6487 |
| Silquest Y-5560 silane, $CH_3(CH_2CH_2O)_7C_3H_6Si(OCH_3)_3$ | 0.0764 | 0.0760 | 0.0758 | 0.0758 | 0.0758 | 0.0762 |
| Sodium silicate | 0.3792 | 0.3772 | 0.3761 | 0.3761 | 0.3760 | 0.3780 |
| Sodium Tolytriazole, 50% | 0.1148 | 0.1142 | 0.1139 | 0.1139 | 0.1139 | 0.1145 |
| Sodium Nitrate | 0.1972 | 0.1961 | 0.1955 | 0.1955 | 0.1955 | 0.1965 |
| Uranine Dye | 0.0020 | 0.0020 | 0.0020 | 0.0020 | 0.0020 | 0.0020 |
| Alizarine dye | | | | | | |
| Polypropylene glycol 2000 (or PPG-2000) | 0.00066 | 0.00066 | 0.00065 | 0.00065 | 0.00065 | 0.00066 |
| n-Propanol | 0.0059 | 0.0059 | 0.0059 | 0.0059 | 0.0059 | 0.0059 |
| Poly(oxyethylene/oxypropylene) monobutyl ether | 0.00003 | 0.00003 | 0.00003 | 0.00003 | 0.00003 | 0.00003 |
| $Na_2MoO_4$, 41.1% | 0.4929 | 0.4985 | 0.4983 | 0.4982 | 0.4982 | 0.4986 |
| Sodium Mecaptobenzothiazole, 50% | | | | | | |
| 1,2,3,4-Butane tetracarboxylic acid | 0.1972 | 0.1994 | 0.1993 | 0.1993 | 0.1993 | 0.1994 |
| $Ca(NO_3)_2*4H_2O$ | 0.0020 | 0.0020 | 0.0020 | 0.0020 | 0.0020 | 0.0020 |
| $Mg(NO_3)_2*6H_2O$ | 0.0079 | 0.0080 | 0.0080 | 0.0080 | 0.0080 | 0.0080 |
| Alco AR-335, 49% solid PAM, 3400 Mw | 0.4929 | 0.2991 | | | | |
| Alco AR-900, 33% solid Na-PAA, 2600 Mw | | 0.6680 | 0.9965 | 0.9965 | 0.9964 | 0.7478 |

TABLE 1-continued

| | | | | | | |
|---|---|---|---|---|---|---|
| Alco Versaflex One | | | | | | |
| Alco Aquatreat AR-540, 44% solid AA copolymer | | | 0.1993 | | | |
| Rohm & Haas Acumer 3100, 43.5% solid AA terpolymer | | | | 0.1993 | | |
| Rohm & Haas Acumer 5000, 45% solid AA terpolymer | | | | | 0.1993 | |
| Potassium Fluoride, 40% w/v | | | | | | |
| Total | 100.000 | 100.000 | 100.000 | 100.000 | 100.000 | 100.000 |

| Mg Protective Test Coolant ID Ingredient | Fluid M WT % | Fluid N WT % | Fluid O WT % | Fluid P WT % | Fluid Q WT % |
|---|---|---|---|---|---|
| Ethylene Glycol | 92.9888 | 93.4043 | 92.9865 | 92.9865 | 94.5765 |
| Deionized Water | 1.9137 | 1.9223 | 1.9137 | 1.9137 | 1.9464 |
| Borax, 5 mol | 0.3885 | 0.3902 | 0.3885 | 0.3885 | 0.3951 |
| NaOH, 50% | 1.3205 | 1.0835 | 1.3230 | 1.3230 | 1.0465 |
| KOH, 45% | | | | | |
| H3PO4, 75% | 0.6452 | 0.6481 | 0.6452 | 0.6452 | 0.6563 |
| Silquest Y-5560 silane, $CH_3(CH_2CH_2O)_7C_3H_6Si(OCH_3)_3$ | 0.0757 | 0.0761 | 0.0757 | 0.0757 | 0.0770 |
| Sodium silicate | 0.3760 | 0.3777 | 0.3760 | 0.3760 | 0.3824 |
| Sodium Tolytriazole, 50% | 0.1139 | 0.1144 | 0.1139 | 0.1139 | 0.1158 |
| Sodium Nitrate | 0.1955 | 0.1963 | 0.1955 | 0.1955 | 0.1988 |
| Uranine Dye | 0.0020 | 0.0020 | 0.0020 | 0.0020 | 0.0020 |
| Alizarine dye | | | | | |
| Polypropylene glycol 2000 (or PPG-2000) | 0.00065 | 0.00066 | 0.00065 | 0.00065 | 0.00067 |
| n-Propanol | 0.0059 | 0.0059 | 0.0059 | 0.0059 | 0.0060 |
| Poly(oxyethylene/oxypropylene) monobutyl ether | 0.00003 | 0.00003 | 0.00003 | 0.00003 | 0.00003 |
| $Na_2MoO_4$, 41.1% | 0.4984 | 0.4996 | 0.4984 | 0.4984 | 0.4970 |
| Sodium Mecaptobenzothiazole, 50% | | | | | |
| 1,2,3,4-Butane tetracarboxylic acid | 0.1994 | | 0.1994 | 0.1994 | |
| $Ca(NO_3)_2 \cdot 4H_2O$ | 0.0020 | 0.0020 | 0.0050 | 0.0100 | |
| $Mg(NO_3)_2 \cdot 6H_2O$ | 0.0080 | 0.0080 | 0.0050 | | |
| Alco AR-335, 49% solid PAM, 3400 Mw | | | | | 0.0994 |
| Alco AR-900, 33% solid Na-PAA, 2600 Mw | 1.2659 | 1.2690 | 1.2659 | 1.2659 | |
| Alco Versaflex One | | | | | |
| Alco Aquatreat AR-540, 44% solid AA copolymer | | | | | |
| Rohm & Haas Acumer 3100, 43.5% solid AA terpolymer | | | | | |
| Rohm & Haas Acumer 5000, 45% solid AA terpolymer | | | | | |
| Potassium Fluoride, 40% w/v | | | | | |
| Total | 100.000 | 100.000 | 100.000 | 100.000 | 100.000 |

Note:
PAM = polyacrylamide;
PAA = polyacrylate;
AA = acrylic acid

Modified ASTM D1384 Coupon Mass Loss (mg/sample/336 hr)

| Metal ID | 60 vol % A | 50 vol % C | 60 vol % #5 | 60 vol % D | 60 vol % E | 60 vol % F | 60 vol % G | 60 vol % H | 60 vol % I | 60 vol % J | 60 vol % K | 60 vol % L |
|---|---|---|---|---|---|---|---|---|---|---|---|---|
| Brass CA 260 | 2.00 | 1.80 | 1.20 | 1.40 | 1.20 | 1.00 | 1.50 | 1.40 | 1.00 | 1.30 | 1.20 | 1.30 |
| SAE 1020 Steel | 0.40 | 0.00 | 0.00 | 0.40 | 0.20 | −24.80 | −0.40 | −0.50 | −0.60 | −0.60 | −0.10 | −0.50 |
| Mg Alloy A (coupled to c-steel via an 6061 Al spacer) | 45.65 | 73.15 | 7.55 | 11.85 | 28.05 | 99.95 | 2.80 | 5.60 | 3.20 | 5.00 | 6.00 | 5.00 |
| Mg Alloy A (coupled to SAE329 via an 6061 Al spacer) | 1.05 | 1.95 | 6.15 | 0.75 | 2.25 | 2.05 | 6.50 | 8.10 | 0.80 | 4.00 | 3.30 | 4.50 |
| Cast Aluminum SAE329 | −2.10 | 0.00 | −1.20 | −1.90 | −1.60 | −1.70 | −1.20 | −1.10 | −1.10 | −1.40 | −1.70 | −1.10 |
| Aluminum 3003 | −1.20 | −1.20 | −0.90 | −0.90 | −1.10 | −0.80 | −0.70 | −0.70 | −0.50 | −0.70 | −0.80 | −0.70 |
| Mg Alloy A (un-coupled) | 2.65 | −0.05 | 3.75 | 3.05 | 4.55 | 3.85 | −1.10 | 2.70 | 1.40 | −0.10 | 1.90 | 4.60 |

TABLE 1-continued

| | | | | | | |
|---|---|---|---|---|---|---|
| $Mg^{2+}$ (mg/L) Initial | 0.63 | 0.16 | 5.85 | 6.07 | 6.39 | 0.36 |
| $Mg^{2+}$ (mg/L) After Test | 2.15 | 0.50 | 12.32 | 9.85 | 4.99 | 8.77 |

Fluid A = 670 g Si #1 + 3.35 g of Na2MoO4, 41.1% => Add 400 ml DI water to make 60 vol % coolant solution
Fluid C = Si #2
Fluid D = 1000 g Si #1 + 5 g Na2MoO4, 41.1% + 2 g AR-335 + 1 g 1,2,3,4-Butane tetracarboxylic acid + 0.002 wt % Ca(NO3)2*4H2O + 0.008 wt % Mg(NO3)2*6H2O + 1.3 g NaOH, 50% => 600 ml of C + 400 ml DI H2O to make 60 vol % solution
Fluid E = 1000 g Si #2 + 1 g AR-335 + 1 g 1,2,3,4-butane tetracarboxylic acid + 0.002 wt % Ca(NO3)2*4H2O + 0.008 wt % Mg(NO3)2*6H2O + 1.3 g NaOH, 50% => 600 ml of D + 400 ml DI H2O to make test solution
Fluid F = Toyota Red Coolant, containing organic acid, phosphate, azole, calcium and magnesium ions. It does not contain silicate.
Fluid #5 see listing in AS-21X table. It is an organic acid based fluid and does not contain silicate.
Fluid B results listed in AS-21X table

| | Modified ASTM D4340 Coupon Mass Loss (mg/cm$^2$/168 hr) | | | | |
|---|---|---|---|---|---|
| Metal ID | 60 vol % G | 60 vol % L | 60 vol % H | 60 vol % J | 50 vol % Q |
| Mg High Temp Alloy A; Test #1 | | 3.63 | 5.03 | 9.11 | |
| Mg High Temp Alloy A; Test #2 | | 3.30 | 7.18 | 5.30 | |
| Mg High Temp Alloy B; Test #1 | | | | | |
| Mg High Temp Alloy B; Test #2 | | | | | |
| Mg AS-21X; Test #1 | | | | | 16.69 |
| Mg AS-21X; Test #2 | | | | | 8.45 |
| Mg AZ-91D; Test #1 | 7.13 | | | | |
| Mg AZ-91D; Test #2 | 13.95 | | | | |
| Average Mass Loss(mg/cm$^2$/168 hr) | 10.54 | 3.47 | 6.10 | 7.20 | 12.57 |

TABLE 2

Mg Protective Test Coolant Formulations - Organic Acid Technology

| | Mg Protective Test Coolant ID | | | | | | |
|---|---|---|---|---|---|---|---|
| Component | Fluid #1 WT % | Fluid #2 WT % | Fluid #3 WT % | Fluid #4 WT % | Fluid #5 WT % | Fluid #6 WT % | Fluid #7 WT % |
| EG | 92.2078 | 92.3600 | 92.2600 | 91.9760 | 92.0080 | 92.1678 | 91.1988 |
| 2-Ethylhexanoic acid | 2.5000 | 2.5000 | 2.5000 | 2.4950 | 2.4975 | 2.4975 | |
| Neo Decanoic acid, Prime | 0.8500 | 0.8500 | 0.8500 | 0.8483 | 0.8492 | 0.8492 | |
| Sebacic Acid | | | | | | | 3.3467 |
| Sodium Hydroxide, 50% | 2.0000 | 1.9000 | 1.9000 | 2.1956 | 2.1379 | 1.9980 | 2.9670 |
| H3PO4, 75% | 0.5000 | 0.5000 | 0.5000 | 0.4990 | 0.4995 | 0.4995 | 0.4995 |
| PBTC, 50% (Bayhibit AM) | 0.0800 | 0.0800 | 0.0800 | 0.0798 | | 0.0799 | 0.0799 |
| 1,2,3,4-Butane tetracarboxylic acid | | | | 0.0998 | 0.0999 | | 0.0999 |
| AR-335, 49% acitve AA/AM, 3400 Mw | | | 0.1000 | | 0.0999 | | |
| AR-550 | | | | | | 0.0999 | |
| AR-540 | | | | | | | |
| Sodium Tolytriazole, 50% | 0.5000 | 0.8000 | 0.8000 | 0.7984 | 0.7992 | 0.7992 | 0.7992 |
| Sodium Nitrate, 40% | 0.3500 | | | | | | |
| Na2MoO4, 41.1% | 0.8000 | 0.8000 | 0.8000 | 0.7984 | 0.7992 | 0.7992 | 0.7992 |
| Ca(NO3)2*4H2O | 0.0027 | 0.0020 | 0.0020 | 0.0020 | 0.0020 | 0.0020 | 0.0020 |
| Mg(NO3)2*6H2O | 0.0095 | 0.0080 | 0.0080 | 0.0080 | 0.0080 | 0.0080 | 0.0080 |
| Polypropylene glycol 2000 | 0.0200 | 0.0200 | 0.0200 | 0.0200 | 0.0200 | 0.0200 | 0.0200 |
| n-Propanol | 0.1790 | 0.1790 | 0.1790 | 0.1786 | 0.1788 | 0.1788 | 0.1788 |
| Poly(oxyethylene/oxypropylene)monobutyl ether | 0.0010 | 0.0010 | 0.0010 | 0.0010 | 0.0010 | 0.0010 | 0.0010 |
| Total | 100.0000 | 100.0000 | 100.0000 | 100.0000 | 100.0000 | 100.0000 | 100.0000 |
| pH_Neat | 7.75 | 7.72 | 7.70 | | | | |
| pH_50% v/v coolant | | | | 7.50 | 7.06 | 7.02 | 7.05 |

| Component | Fluid #8 WT % | Fluid #9 WT % | Fluid #10 WT % | Fluid #11 WT % | Fluid #12 WT % | Fluid #13 WT % | Fluid #14 WT % |
|---|---|---|---|---|---|---|---|
| EG | 92.1600 | 91.9400 | 93.0600 | 92.0508 | 92.0500 | 91.8200 | 92.6200 |
| 2-Ethylhexanoic acid | 2.5000 | 2.5000 | 2.5000 | 2.4998 | 2.5000 | 2.5000 | 2.5000 |
| Neo Decanoic acid, Prime | 0.8500 | 0.8500 | 0.8500 | 0.8499 | 0.8500 | 0.8500 | 0.8500 |
| Sebacic Acid | | | | | | | |
| Sodium Hydroxide, 50% | 2.0000 | 2.1000 | 1.6000 | 2.1098 | 2.1200 | 2.1200 | 2.1200 |
| H3PO4, 75% | 0.5000 | 0.5000 | | 0.5000 | 0.5000 | 0.5000 | 0.5000 |
| PBTC, 50% (Bayhibit AM) | 0.0800 | | 0.0800 | 0.0800 | 0.0800 | | |
| 1,2,3,4-Butane tetracarboxylic acid | | | | | | | |
| AR-335, 49% acitve AA/AM, 3400 Mw | | 0.3000 | 0.1000 | 0.1000 | 0.1000 | 0.3000 | 0.3000 |
| AR-550 | | | | | | | |
| AR-540 | 0.1000 | | | | | 0.1000 | 0.1000 |
| Sodium Tolytriazole, 50% | 0.8000 | 0.8000 | 0.8000 | 0.7999 | 0.8000 | 0.8000 | 0.8000 |
| Sodium Nitrate, 40% | | | | | | | |

TABLE 2-continued

| | | | | | | | |
|---|---|---|---|---|---|---|---|
| Na2MoO4, 41.1% | | 0.8000 | 0.8000 | 0.8000 | 0.7999 | 0.8000 | 0.8000 | |
| Ca(NO3)2*4H2O | | 0.0020 | 0.0020 | 0.0020 | | | 0.0020 | 0.0020 |
| Mg(NO3)2*6H2O | | 0.0080 | 0.0080 | 0.0080 | 0.0100 | | 0.0080 | 0.0080 |
| Polypropylene glycol 2000 | | 0.0200 | 0.0200 | 0.0200 | 0.0200 | 0.0200 | 0.0200 | 0.0200 |
| n-Propanol | | 0.1790 | 0.1790 | 0.1790 | 0.1790 | 0.1790 | 0.1790 | 0.1790 |
| Poly(oxyethylene/oxypropylene)monobutyl ether | | 0.0010 | 0.0010 | 0.0010 | 0.0010 | 0.0010 | 0.0010 | 0.0010 |
| Total | | 100.0000 | 100.0000 | 100.0000 | 100.0000 | 100.0000 | 100.0000 | 100.0000 |
| pH_Neat | | | | | | | | |
| pH_50% v/v coolant | | 7.00 | 7.54 | 7.60 | 7.54 | 7.52 | 7.59 | 7.60 |

Modified D1384 Test Mass Loss Results - Magnesium alloy = AS-21X in 60 wt % or 60 vol % EG + inhibitor treatment
(High conductivity formulation)

Modified D1384 Coupon Mass Loss (mg/sample/336 hr)

| Metal ID | 60 wt % #1 | 60 wt % #2 | 60 wt % #3 | 60 vol % #4 | 60 vol % #5 | 60 vol % #6 | 60 vol % #7 | 60 vol % #8 | 60 vol % #9 | 60 vol % #10 | 60 vol % #11 | 60 vol % #12 | 60 vol % #13 | 60 vol % #14 | 60 vol % B |
|---|---|---|---|---|---|---|---|---|---|---|---|---|---|---|---|
| Brass CA 260 | 1.4 | 2.8 | 3 | 3.1 | 2.5 | 4.3 | 2.5 | 3.9 | 2 | 4.5 | 1.9 | 2.3 | 2.4 | 2.6 | 1.7 |
| SAE 1020 Steel | −2.9 | −1.7 | −0.5 | −0.3 | −0.4 | −1.2 | −0.4 | −0.5 | −0.4 | −0.9 | −0.2 | 0.1 | −0.1 | −0.5 | −0.3 |
| Mg AS-21X (coupled to carbon steel via an 6061 Al spacer) | 23.7 | 29.35 | 12.75 | 10.05 | 10.75 | 13.75 | 13.75 | 10.85 | −3.8 | 703.8 | 14.4 | 9.3 | 9.4 | 14 | 37.95 |
| Mg AX-21X (coupled to SAE329 cast Al via an 6061 Al spacer) | 10.5 | 13.45 | 4.45 | 12.15 | 9.95 | 13.25 | 12.85 | 10.95 | 3.8 | 630.1 | 15.2 | 12.2 | 5.1 | 11.3 | 4.25 |
| Cast Aluminum SAE329 | −2.4 | −2 | −1.5 | −0.6 | −1.5 | −1 | −0.4 | −1.9 | −2.3 | 87.3 | −1.6 | −1.2 | −2.1 | 3.1 | −2.4 |
| Aluminum 3003 | −0.4 | −0.06 | −0.3 | −0.1 | −0.1 | −0.4 | −0.1 | −0.1 | −0.1 | 0.6 | 0.3 | 0 | 0.1 | 0.2 | −0.6 |
| Mg AS-21X (un-coupled) | 27.3 | 20.95 | 10.35 | 9.45 | 6.95 | 21.35 | 6.25 | 24.25 | 7 | 21.4 | 11.5 | 10.3 | 3.3 | 20.1 | 2.25 |
| $Mg^{2+}$ (mg/L) Initial | 6.86 | 7.02 | 5.03 | 9.21 | 5.74 | 6.27 | 4.63 | 6.13 | 6.09 | 6.11 | | | | | 5.25 |
| $Mg^{2+}$ (mg/L) After Test | 33.53 | 28.25 | 25.25 | 15.00 | 24.78 | 34.41 | 17.09 | 31.91 | | | | | | | 0.29 |

As can be seen from Table 1, example heat transfer fluid formulations prepared according to the teaching of the instant invention (i.e., Fluids L, K, J, I, H, G, D, E, and #5) yield much better performance (i.e., lower magnesium alloy mass loss or lower corrosion rate) than the those of the comparison examples A, B (see results in Table 2), C, and F in modified ASTM D1384 tests. In the modified D4340 test, fluid L yielded the best corrosion protection results (i.e., lowest mass loss in the test samples) for magnesium alloy. Fluid F is Toyota's Long Life red coolant, an organic acid based coolant containing benzoic acid, phosphoric acid, molybdate, azoles, 2-phosphono-butane-1,2,4-tricarboxylic acid, nitrate, dye, antifoam, and water soluble calcium and magnesium salts, but without water soluble polymer.

Table 2 shows that the example heat transfer fluid formulations prepared according to the teaching of the instant invention (i.e., fluids #3 to #5, #9, and #11 to #13) yielded better corrosion protection for magnesium alloy than the comparison examples of fluid #1 to #2. Fluid #4 and #7 also yielded low magnesium corrosion rates, suggesting that the water soluble polymer does not have to be present if 1,2,3,4-butane tetra-carboxylic acid is present in the formulation. Results from fluid #6 and #8 show that the presence of 1,2,3, 4-butane tetacarboxylic acid is beneficial for yielding lower Mg corrosion rates. Results from Fluid #10 show that the presence of phosphate in the formulation is critical in yielding low magnesium corrosion rate. Results from fluid #13 and #14 show that the presence of molybdate in the organic acid based formulations is very helpful in obtaining lower Mg corrosion rate. Results from fluid #9 and #13 show the absence of 1,2,3,4-butane tetracarboxylic acid in the formulation may be compensated by using a higher level of water soluble polymer AR-335. Results from fluid #3, #11 and #12 show that in the presence of relatively low water soluble concentration, the presence of magnesium ion may not be beneficial to the reduction of magnesium corrosion rate. Under such conditions, the required components of the corrosion inhibitor in the preferred heat transfer fluid for magnesium corrosion protection is phosphate, water soluble polymer or alkane tetracarboxylic acid, molybdate, azoles and $C_4$-$C_{22}$ aliphatic or aromatic mono or di-carboxylic acid. Calcium, zinc, Sr and Mg ions, colorants, antifoam, and other coolant additives are the optional components.

Additional examples of heat transfer fluids in accordance with the present invention is shown in Table 3 below. Fluid #L, Fluid #S and Fluid #U have particularly good properties. After one day of immersion under ASTM D4340 test conditions, Fluid #U appeared to be yielding the best results. Magnesium High Temperature Alloy B sample was still showing shiny original metallic magnesium color, while samples in the rest of the fluids are showing brown/dark brown colors. The results provided in Table 1-3 also show that the heat transfer fluids formulated in accordance with the present invention can also provide excellent corrosion protection for other non-magnesium alloys commonly used in engine cooling systems. The corrosion protection performance of the disclosed fluids for these non-magnesium alloys meets the performance requirements as specified in ASTM D3306 and D4985.

TABLE 3

Mg Protective Test Coolant Formulations - Silicate Based Technology

| Mg Protective Test Coolant ID<br>Ingredient | Si #1<br>WT % | Fluid A<br>WT % | Fluid B<br>WT % | Si #2<br>WT % | Fluid C<br>WT % | Fluid D<br>WT % | Fluid E<br>WT % | Fluid F<br>WT % |
|---|---|---|---|---|---|---|---|---|
| Ethylene Glycol | 95.1440 | 94.6706 | 94.9126 | 95.1770 | 95.1770 | 94.2580 | 94.7601 | |
| Deionized Water | 1.9581 | 1.9484 | 1.9533 | 1.5844 | 1.5844 | 1.9399 | 1.5775 | |
| Borax, 5 mol | 0.3975 | 0.3955 | 0.3955 | 0.3000 | 0.3000 | 0.3938 | 0.2987 | |
| NaOH, 50% | 1.0528 | 1.0476 | 1.1837 | 0.0313 | 0.0313 | 1.1718 | 0.1606 | |
| KOH, 45% | | | | 1.3777 | 1.3777 | | 1.3717 | |
| H3PO4, 75% | 0.6602 | 0.6569 | 0.6586 | 0.6000 | 0.6000 | 0.6541 | 0.5974 | |
| Silquest Y-5560 silane, $CH_3(CH_2CH_2O)_7C_3H_6Si(OCH_3)_3$ | 0.0775 | 0.0771 | 0.0773 | 0.0364 | 0.0364 | 0.0768 | 0.0362 | |
| Sodium silicate | 0.3847 | 0.3828 | 0.3838 | 0.1601 | 0.1601 | 0.3811 | 0.1594 | |
| Sodium Tolytriazole, 50% | 0.1165 | 0.1159 | 0.1162 | 0.1100 | 0.1100 | 0.1154 | 0.1095 | |
| Sodium Nitrate | 0.2000 | 0.1990 | 0.1995 | 0.2000 | 0.2000 | 0.1981 | 0.1991 | |
| Uranine Dye | 0.0020 | 0.0020 | 0.0020 | 0.0034 | 0.0034 | 0.0020 | 0.0034 | |
| Alizarine dye | | | | 0.0030 | 0.0030 | | 0.0030 | |
| Polypropylene glycol 2000 (or PPG-2000) | 0.00067 | 0.00067 | 0.00067 | 0.00067 | 0.00067 | 0.00066 | 0.00067 | |
| n-Propanol | 0.0060 | 0.0060 | 0.0060 | 0.0060 | 0.0060 | 0.0059 | 0.0060 | |
| Poly(oxyethylene/oxypropylene) monobutyl ether | 0.00003 | 0.00003 | 0.00003 | 0.00003 | 0.00003 | 0.00003 | 0.00003 | |
| $Na_2MoO_4$, 41.1% | | 0.4975 | | 0.3000 | 0.3000 | 0.4953 | 0.2987 | |
| Sodium Mecaptobenzothiazole, 50% | | | | 0.1100 | 0.1100 | | 0.1095 | |
| 1,2,3,4-Butane tetracarboxylic acid | | | 0.0998 | | | 0.0991 | 0.0996 | |
| $Ca(NO_3)_2 \cdot 4H_2O$ | | | 0.0020 | | | 0.0020 | 0.0020 | |
| $Mg(NO_3)_2 \cdot 6H_2O$ | | | 0.0080 | | | 0.0079 | 0.0080 | |
| Alco AR-335, 49% solid PAM, 3400 Mw | | | | | | 0.1981 | 0.0996 | |
| Alco AR-900, 33% solid Na-PAA, 2600 Mw | | | | | | | | |
| Alco Versaflex One | | | | | | | 0.0996 | |
| Alco Aquatreat AR-540, 44% solid AA copolymer | | | | | | | | |
| Rohm & Haas Acumer 3100, 43.5% solid AA terpolymer | | | | | | | | |
| Rohm & Haas Acumer 5000, 45% solid AA terpolymer | | | | | | | | |
| Potassium Fluoride, 40% w/v | | | | | | | | |
| Total | 100.000 | 100.000 | 100.000 | 100.000 | 100.000 | 100.000 | 100.000 | |

| Mg Protective Test Coolant ID<br>Ingredient | Fluid G<br>WT % | Fluid H<br>WT % | Fluid I<br>WT % | Fluid J<br>WT % | Fluid K<br>WT % | Fluid L<br>WT % | Fluid M<br>WT % | Fluid N<br>WT % |
|---|---|---|---|---|---|---|---|---|
| Ethylene Glycol | 93.7934 | 93.2942 | 93.0107 | 93.0061 | 93.0015 | 93.4933 | 92.9888 | 93.4043 |
| Deionized Water | 1.9303 | 1.9200 | 1.9142 | 1.9141 | 1.9140 | 1.9241 | 1.9137 | 1.9223 |
| Borax, 5 mol | 0.3919 | 0.3898 | 0.3886 | 0.3886 | 0.3885 | 0.3906 | 0.3885 | 0.3902 |
| NaOH, 50% | 1.2646 | 1.3015 | 1.3680 | 1.3729 | 1.3778 | 1.3137 | 1.3205 | 1.0835 |
| KOH, 45% | | | | | | | | |
| H3PO4, 75% | 0.6508 | 0.6474 | 0.6454 | 0.6454 | 0.6453 | 0.6487 | 0.6452 | 0.6481 |
| Silquest Y-5560 silane, $CH_3(CH_2CH_2O)_7C_3H_6Si(OCH_3)_3$ | 0.0764 | 0.0760 | 0.0758 | 0.0758 | 0.0758 | 0.0762 | 0.0757 | 0.0761 |
| Sodium silicate | 0.3792 | 0.3772 | 0.3761 | 0.3761 | 0.3760 | 0.3780 | 0.3760 | 0.3777 |
| Sodium Tolytriazole, 50% | 0.1148 | 0.1142 | 0.1139 | 0.1139 | 0.1139 | 0.1145 | 0.1139 | 0.1144 |
| Sodium Nitrate | 0.1972 | 0.1961 | 0.1955 | 0.1955 | 0.1955 | 0.1965 | 0.1955 | 0.1963 |
| Uranine Dye | 0.0020 | 0.0020 | 0.0020 | 0.0020 | 0.0020 | 0.0020 | 0.0020 | 0.0020 |
| Alizarine dye | | | | | | | | |
| Polypropylene glycol 2000 (or PPG-2000) | 0.00066 | 0.00066 | 0.00065 | 0.00065 | 0.00065 | 0.00066 | 0.00065 | 0.00066 |
| n-Propanol | 0.0059 | 0.0059 | 0.0059 | 0.0059 | 0.0059 | 0.0059 | 0.0059 | 0.0059 |
| Poly(oxyethylene/oxypropylene) monobutyl ether | 0.00003 | 0.00003 | 0.00003 | 0.00003 | 0.00003 | 0.00003 | 0.00003 | 0.00003 |
| $Na_2MoO_4$, 41.1% | 0.4929 | 0.4985 | 0.4983 | 0.4982 | 0.4982 | 0.4986 | 0.4984 | 0.4996 |
| Sodium Mecaptobenzothiazole, 50% | | | | | | | | |
| 1,2,3,4-Butane tetracarboxylic acid | 0.1972 | 0.1994 | 0.1993 | 0.1993 | 0.1993 | 0.1994 | 0.1994 | |
| $Ca(NO_3)_2 \cdot 4H_2O$ | 0.0020 | 0.0020 | 0.0020 | 0.0020 | 0.0020 | 0.0020 | 0.0020 | 0.0020 |
| $Mg(NO_3)_2 \cdot 6H_2O$ | 0.0079 | 0.0080 | 0.0080 | 0.0080 | 0.0080 | 0.0080 | 0.0080 | 0.0080 |
| Alco AR-335, 49% solid PAM, 3400 Mw | 0.4929 | 0.2991 | | | | | | |
| Alco AR-900, 33% solid Na-PAA, 2600 Mw | | 0.6680 | 0.9965 | 0.9965 | 0.9964 | 0.7478 | 1.2659 | 1.2690 |
| Alco Versaflex One | | | | | | | | |
| Alco Aquatreat AR-540, 44% solid AA copolymer | | | | 0.1993 | | | | |
| Rohm & Haas Acumer 3100, 43.5% solid AA terpolymer | | | | | 0.1993 | | | |
| Rohm & Haas Acumer 5000, 45% solid AA terpolymer | | | | | | 0.1993 | | |
| Potassium Fluoride, 40% w/v | | | | | | | | |
| Total | 100.000 | 100.000 | 100.000 | 100.000 | 100.000 | 100.000 | 100.000 | 100.000 |

TABLE 3-continued

| Mg Protective Test Coolant ID Ingredient | Fluid O WT % | Fluid P WT % | Fluid Q WT % | Fluid R WT % | Fluid S WT % | Fluid T WT % | Fluid U WT % | Fluid V WT % |
|---|---|---|---|---|---|---|---|---|
| Ethylene Glycol | 92.9865 | 92.9865 | 94.5765 | 93.4981 | 93.4933 | 93.0736 | 90.4261 | 93.3811 |
| Deionized Water | 1.9137 | 1.9137 | 1.9454 | 1.9242 | 1.9241 | 1.9155 | 1.8610 | 1.9218 |
| Borax, 5 mol | 0.3885 | 0.3885 | 0.3951 | 0.3906 | 0.3906 | 0.3889 | 0.3778 | 0.3901 |
| NaOH, 50% | 1.3230 | 1.3230 | 1.0465 | 1.3144 | 1.3145 | 1.5580 | 1.2714 | 1.3330 |
| KOH, 45% | | | | | | | | |
| $H_3PO_4$, 75% | 0.6452 | 0.6452 | 0.6563 | 0.6488 | 0.6487 | 0.6458 | 0.6275 | 0.6480 |
| Silquest Y-5560 silane, $CH_3(CH_2CH_2O)_7C_3H_6Si(OCH_3)_3$ | 0.0757 | 0.0757 | 0.0770 | 0.0762 | 0.0762 | 0.0758 | 0.0737 | 0.0761 |
| Sodium silicate | 0.3760 | 0.3760 | 0.3824 | 0.3870 | 0.3780 | 0.3763 | 0.3656 | 0.3776 |
| Sodium Tolytriazole, 50% | 0.1139 | 0.1139 | 0.1158 | 0.1145 | 0.1145 | 0.1140 | 0.1107 | 0.1143 |
| Sodium Nitrate | 0.1955 | 0.1955 | 0.1988 | 0.1965 | 0.1965 | 0.1956 | 0.1901 | 0.1963 |
| Uranine Dye | 0.0020 | 0.0020 | 0.0020 | 0.0020 | 0.0020 | 0.0020 | 0.0019 | 0.0020 |
| Alizarine dye | | | | | | | | |
| Polypropylene glycol 2000 (or PPG-2000) | 0.00065 | 0.00065 | 0.00067 | 0.00066 | 0.00066 | 0.00067 | 0.00067 | 0.00066 |
| n-Propanol | 0.0059 | 0.0059 | 0.0060 | 0.0059 | 0.0059 | 0.0060 | 0.0060 | 0.0059 |
| Poly(oxyethylene/oxypropylene) monobutyl ether | 0.00003 | 0.00003 | 0.00003 | 0.00003 | 0.00003 | 0.00003 | 0.00003 | 0.00003 |
| $Na_2MoO_4$, 41.1% | 0.4984 | 0.4984 | 0.4970 | 0.5000 | 0.5000 | 0.4978 | 0.4836 | 0.4994 |
| Sodium Mecaptobenzothiazole, 50% | | | | | | | | |
| 1,2,3,4-Butane tetracarboxylic acid | 0.1994 | 0.1994 | | 0.2000 | 0.2000 | 0.3986 | 0.1934 | 0.1998 |
| $Ca(NO_3)_2 \cdot 4H_2O$ | 0.0050 | 0.0100 | | | 0.0050 | 0.0050 | 0.0048 | 0.0050 |
| $Mg(NO_3)_2 \cdot 6H_2O$ | 0.0050 | | | | | | | |
| Alco AR-335, 49% solid PAM, 3400 Mw | | | 0.0994 | | | | | |
| Alco AR-900, 33% solid Na-PAA, 2600 Mw | 1.2659 | 1.2659 | | 0.7500 | 0.7500 | 0.7466 | 0.7254 | 0.7491 |
| Alco Versaflex One | | | | | | | | |
| Alco Aquatreat AR-540, 44% solid AA copolymer | | | | | | | | |
| Rohm & Haas Acumer 3100, 43.5% solid AA terpolymer | | | | | | | | 0.1000 |
| Rohm & Haas Acumer 5000, 45% solid AA terpolymer | | | | | | | | |
| Potassium Fluoride, 40% w/v | | | | | | | 3.2807 | |
| Total | 100.000 | 100.000 | 100.000 | 100.000 | 100.000 | 100.000 | 100.000 | 100.000 |

Note:
PAM = polyacrylamide;
PAA = polyacrylate;
AA = acrylic acid

Modified ASTM D1304 Coupon Mass Loss (mg/sample/336 hr)

| Metal ID | 60 vol % A | 50 vol % C | 60 vol % #5 | 60 vol % D | 60 vol % E | 60 vol % F | 60 vol % G | 60 vol % H | 60 vol % I | 60 vol % J | 60 vol % K | 60 vol % L |
|---|---|---|---|---|---|---|---|---|---|---|---|---|
| Brass CA 260 | 2.00 | 1.80 | 120 | 1.40 | 1.20 | 1.00 | 1.50 | 1.40 | 1.00 | 1.30 | 1.20 | 1.30 |
| SAE 1020 Steel | 0.40 | 0.00 | 0.00 | 0.40 | 0.20 | −24.80 | −0.40 | −0.50 | −0.60 | −0.60 | −0.10 | −0.50 |
| Mg Alloy A (coupled to c-steel via an 6061 Al spacer) | 45.65 | 73.15 | 7.55 | 11.85 | 28.05 | 99.95 | 2.80 | 5.60 | 3.20 | 5.00 | 6.00 | 5.00 |
| Mg Alloy A (coupled to SAE329 via an 6061 Al spacer) | 1.05 | 1.95 | 6.15 | 0.75 | 2.25 | 2.05 | 6.50 | 8.10 | 0.80 | 4.00 | 3.30 | 4.50 |
| Cast Aluminum SAE329 | −2.10 | 0.00 | −1.20 | −1.90 | −1.60 | −1.70 | −1.20 | −1.10 | −1.10 | −1.40 | −1.70 | −1.10 |
| Aluminum 3003 | −1.20 | −1.20 | −0.90 | −0.90 | −1.10 | −0.80 | −0.70 | −0.70 | −0.50 | −0.70 | −0.80 | −0.70 |
| Mg Alloy A (un-coupled) | 2.65 | −0.05 | 3.75 | 3.05 | 4.55 | 3.85 | −1.10 | 2.70 | 1.40 | −0.10 | 1.90 | 4.60 |
| $Mg^{2+}$ (mg/L) Initial | 0.63 | 0.16 | 5.85 | 6.07 | 6.39 | 0.36 | | | | | | |
| $Mg^{2+}$ (mg/L) After Test | 2.15 | 0.50 | 12.32 | 9.85 | 4.99 | 8.77 | | | | | | |

Fluid A = 670 g Si #1 + 3.35 g of Na2MoO4, 41.1% => Add 400 ml DI water to make 60 vol % coolant solution
Fluid C = Si #2
Fluid D = 1000 g Si #1 + 5 g Na2MoO4, 41.1% + 2 g AR-335 + 1 g 1,2,3,4-Butane tetracarboxylic acid + 0.002 wt % Ca(NO3)2*4H2O + 0.008 wt % Mg(NO3)2*6H2O + 1.3 g NaOH, 50% => 600 ml of C + 400 ml DI water to make 60 vol % solution
Fluid E = 1000 g Si #2 + 1 g AR-335 + 1 g 1,2,3,4-butane tetracarboxylic acid + 0.002 wt % Ca(NO3)2*4H2O + 0.008 wt % Mg(NO3)2*6H2O + 1.3 g NaOH, 50% => 600 ml of D + 400 ml DI H2O to make test solution
Fluid F = Toyota Red Coolant, containing organic acid, phosphate, azole, calcium and magnesium ions. It does not contain silicate.
Fluid #5 see listing in AS-21X table. It is an organic acid based fluid and does not contain silicate.
Fluid B results listed in AS-21X table Modified ASTM D4340 Coupon Mass Loss (mg/cm²/168 hr)

| Metal ID | 60 vol % G | 60 vol % L | 60 vol % H | 60 vol % J | 50 vol % Q | 60 vol % M | 60 vol % N | 60 vol % O | 60 vol % P | 60 vol % Si #1 |
|---|---|---|---|---|---|---|---|---|---|---|
| Mg High Temp Alloy A; Test #1 | | 3.63 | 5.03 | 9.11 | | | | | | |
| Mg High Temp Alloy A; Test #2 | | 3.30 | 7.18 | 5.30 | | | | | | |
| Mg High Temp Alloy B; Test #1 | | | | | | 7.49 | 7.68 | 8.55 | 5.69 | 28.29 |
| Mg High Temp Alloy B; Test #2 | | | | | | | | | | |
| Mg AS-21X; Test #1 | | | | | 16.69 | | | | | |
| Mg AS-21X; Test #2 | | | | | 8.45 | | | | | |

TABLE 3-continued

| | | | | | | | | | |
|---|---|---|---|---|---|---|---|---|---|
| Mg AZ-91D; Test #1 | 7.13 | | | | | | | | |
| Mg AZ-91D; Test #2 | 13.95 | | | | | | | | |
| Average Mass Loss(mg/cm²/168 hr) | 10.54 | 3.47 | 6.10 | 7.20 | 12.57 | 7.49 | 7.68 | 8.55 | 5.69 | 28.29 |

Note
Sample #1 pitting on general surface   7 shallow   20 shallow   15% pit   80%, shallow   20% deep pit   15% pits   8% pits   100% attack
Sample #2 Pitting on general surface   6 shallow   25 shallow   −10 shallow
Max Pit depth/Point Micrometer   25 μm   50 μm The terms "first," "second," and the like as used herein do not denote any order, quantity, or importance, but rather are used to distinguish one element from another. The terms "a" and "an" do not denote a limitation of quantity, but rather denote the presence of at least one of the referenced item. Compounds are described using standard nomenclature. For example, any position not substituted by any indicated group is understood to have its valency filled by a bond as indicated, or a hydrogen atom. A dash ("-") that is not between two letters or symbols is used to indicate a point of attachment for a substituent. For example, —CHO is attached through carbon of the carbonyl group. The endpoints of all ranges directed to the same component or property are inclusive and independently combinable. The modifier "about" used in connection with a quantity is inclusive of the stated value and has the meaning dictated by the context (e.g., includes the degree of error associated with measurement of the particular quantity).

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the present application.

What is claimed is:

1. A corrosion inhibiting composition formed by combining components comprising:
   (a) an inorganic phosphate;
   (b) a water soluble polyelectrolyte polymer dispersant;
   (c) a tri or tetracarboxylic acid; and
   (d) at least one additional component comprising at least one selected from the group consisting of a $C_4$-$C_{22}$ aliphatic or aromatic mono- or dicarboxylic acid; a silicate and at least one of a silicone or a silicate stabilizing siloxane compound; and combinations comprising at least one of the foregoing;
   wherein the tri- or tetracarboxylic acid (c) comprises a $C_4$ to $C_{20}$ aliphatic tetra-carboxylic acid where the carboxylic groups are located at 1, 2, 3, 4 positions, a $C_3$ to $C_{24}$ aliphatic tricarboxylic acid or the corresponding anhydrides without or with at least one additional hydroxyl group in an aliphatic chain.

2. The corrosion inhibiting composition of claim 1 further comprising a pH adjusting agent.

3. The corrosion inhibiting composition of claim 1 wherein component (d) further comprises one or more members selected from the group consisting of a $C_4$-$C_{22}$ aliphatic or aromatic mono- or dicarboxylic acid, a fluoride, spiculisporic acid, a molybdate, an azole compound, a phosphonate, a phosphinate, an amine salt, a borate and combinations comprising at least one of the foregoing.

4. The corrosion inhibiting composition of claim 1, further comprising at least one metal ion selected from the group consisting of calcium, magnesium, strontium, zinc and combinations thereof.

5. The corrosion inhibiting composition of claim 1, wherein the water soluble polyelectrolyte polymer dispersant (b) is at least one of an acrylic acid or methacrylic acid based homopolymer, copolymer, terpolymer, or quadpolymer, or the water soluble salts thereof; an acrylamide based homopolymer, copolymer, terpolymer or quadpolymer, or the water soluble salts thereof; a maleic acid or a maleic anhydride based homopolymer, copolymer, terpolymer, or quadpolymer, or the water soluble salts thereof; vinylpyrrolidone based homopolymers or copolymers; alkylene oxide based copolymers or terpolymers; or a combination comprising one or more of the foregoing.

6. The corrosion inhibiting composition of claim 1, wherein the water soluble polyelectrolyte polymer dispersant (b) comprises at least 5 mole % of mer units selected from the group consisting of acrylic acid, methacrylic acid, crotonic acid, vinyl acetic acid, 4-methyl-4 penenoic acid, maleic acid, maleic anhydride, 1,2,3,6-tetrahydrophthalic anhydride, 3,6-epoxy-1,2,3,6-tetrahydrophthalic anhydride, 5-norbornene-2,3-dicarboxylic anhydride, bicycle[2,2,2]-5-octene-2,3-dicarboxylic anhydride, 3-methyl-1,2,6-tetrahydrophthalic anhydride, 2-methyl-1,3,6-tetrahydrophthalic anhydride, itaconic acid, mesaconic acid, methylenemalonic acid, fumaric acid, citraconic acid, 2-acrylamido-2-methylpropanesulfonic acid, 3-allyloxy-2-hydroxy propane sulfonic acid, allyl phosphonic acid, allyloxybenzenesulfonic acid, 2-hydroxy-3-(2-propenyloxy)propanesulfonic acid, allylsulfonic acid, acrylamidomethyl propane sulfonic acids, methallyl sulfonic acid, isopro-phenylsulfonic acid, vinylphosphonic acid, styrenesulfonic acid, vinylsulfonic acid, aspartic acid, hydroxamic acid, adipic acid, and the alkali metal or ammonium salts thereof; methyl acrylate, ethyl acrylate, butyl acrylate, n-hexyl acrylate, methyl methacrylate, ethyl methacrylate, butyl methacrylate, isobutyl methacrylate, t-butylaminoethyl methacrylate, diethylaminoethyl acrylate, hydroxyethyl methacrylate, hydroxyethyl acrylate, hydroxypropyl acrylate, hydroxypropyl methacrylate, diethylaminoethyl methacrylate, dimethylaminoethyl methacrylate, dimethylaminoethyl acrylate, tertiary butylacrylate, polyethyleneglycol monomethacrylate, phosphoethyl methacrylate, and vinyl acetate; acrylamide (or 2-propenamide), methacrylamide, ethyl acrylamide, propyl acrylamide, N-t-butylacrylamide, tertiary butyl methacrylamide, tertiary octyl acrylamide, N-methylacrylamide, N,N-dimethylacrylamide (or N,N-dimethyl-2-propenamide), dimethylaminopropyl methacrylamide, cyclohexyl acrylamide, benzyl methacrylamide, vinyl acetamide, sulfomethylacrylamide, sulfoethylacrylamide, 2-hydroxy-3-sulfopropyl acrylamide, sulfophenylacrylamide, N-vinyl formamide, N-vinyl acetamide, 2-hydroxy-3-sulfopropyl acrylamide, N-vinyl pyrrolidone (a cyclic amide), 2-vinylpyridene, 4-vinylpyridenem and carboxymethylacrylamide; maleic anhydride (or 2,5-furandione) and succinic anhydride; acrylonitrile and methacrylonitrile; acrylamidopropyltrimethylammonium chloride, diallyldimethylammonium chloride, and methacrylamidopropyltrimethylammonium chloride; 1,2-dihydroxy-3-butene, allyl alcohol, ethylene glycoldiacrylate, 2-ethyl-oxazoline, diethylenetriamine, ethylene oxide, propylene oxide, ammonia, styrene, ethylene diamine, dimethylamine, diallyl phthalate, polyethylene glycol monomethacrylate, sodium styrene sulfonate, an alkoxylated allyl alcohol sulfonate or mixtures thereof.

7. The corrosion inhibiting composition of claim 1, wherein the a tri- or tetracarboxylic acid (c) comprises 1,2,3,4-butane tetracarboxylic acid, 1,2,3,4-pentane tetracarboxylic acid, 1,2,3,4-hexane tetracarboxylic acid, or the corresponding anhydrides without or with at least one additional hydroxyl group in the aliphatic chains.

8. The corrosion inhibiting composition of claim 7 wherein the tri- or tetracarboxylic acid (c) comprises at least one of the group consisting of citric acid, 3-hydroxy-1,3,4-alkane tricarboxylic acid, 2-(2-carboxyethyl)-3-decyl maleic anhydride, cyclohexenoic tricarboxylic acids, and combinations thereof.

9. The corrosion inhibiting composition of claim 1, wherein the at least one additional component (d) comprises a silicate and at least one of a silicone or a silicate stabilizing siloxane compound.

10. The corrosion inhibiting composition of claim 9 wherein the at least one additional component (d) further comprises an azole compound.

11. The corrosion inhibiting composition of claim 1, wherein the at least one additional component (d) comprises a $C_6$-$C_{24}$ aliphatic or aromatic mono- or di-carboxylic acid.

12. The corrosion inhibiting composition of claim 11 wherein the at least one additional component (d) further comprises an azole compound and a water soluable molybate salt.

13. The corrosion inhibiting composition of claim 2, wherein the at least one additional component (d) further comprises an amine salt of cyclohexenoic carboxylate compounds derived from tall oil fatty acids.

14. A heat transfer fluid formed from a combination of components comprising:
  about 5% to about 99% by weight of freezing point-depressing agent;
  about 1% to about 95% by weight of water; and
  the corrosion inhibitor composition of claim 1.

15. A method of reducing corrosion in heat transfer system comprising magnesium or a magnesium alloy-containing component, the method comprising contacting the component with the heat transfer fluid of claim 14.

* * * * *

UNITED STATES PATENT AND TRADEMARK OFFICE
CERTIFICATE OF CORRECTION

PATENT NO. : 7,645,331 B2  Page 1 of 1
APPLICATION NO. : 11/552870
DATED : January 12, 2010
INVENTOR(S) : Yang et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 435 days.

Signed and Sealed this

Sixteenth Day of November, 2010

David J. Kappos
*Director of the United States Patent and Trademark Office*